United States Patent
Irie et al.

(10) Patent No.: US 11,437,634 B2
(45) Date of Patent: Sep. 6, 2022

(54) FUEL CELL SYSTEM, HYBRID POWER GENERATION SYSTEM, AND CONTROL METHOD FOR FUEL CELL SYSTEM

(71) Applicant: MITSUBISHI HITACHI POWER SYSTEMS, LTD., Yokohama (JP)

(72) Inventors: Hiroki Irie, Kanagawa (JP); Takuma Nagai, Kanagawa (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/963,391

(22) PCT Filed: Feb. 14, 2019

(86) PCT No.: PCT/JP2019/005344
§ 371 (c)(1),
(2) Date: Jul. 20, 2020

(87) PCT Pub. No.: WO2019/160036
PCT Pub. Date: Aug. 22, 2019

(65) Prior Publication Data
US 2021/0075034 A1 Mar. 11, 2021

(30) Foreign Application Priority Data

Feb. 15, 2018 (JP) .............................. JP2018-025110

(51) Int. Cl.
*H01M 8/04* (2016.01)
*H01M 8/04089* (2016.01)
(Continued)

(52) U.S. Cl.
CPC ... *H01M 8/04104* (2013.01); *H01M 8/04014* (2013.01); *H01M 8/04111* (2013.01);
(Continued)

(58) Field of Classification Search
CPC ......... H01M 8/04104; H01M 8/04303; H01M 8/04014; H01M 8/04111
See application file for complete search history.

(56) References Cited

U.S. PATENT DOCUMENTS

| 2008/0152987 A1* | 6/2008 | Nakashima ....... H01M 8/04089 |
| | | 429/414 |
| 2009/0061263 A1* | 3/2009 | Watanabe ......... H01M 8/04395 |
| | | 429/431 |

(Continued)

FOREIGN PATENT DOCUMENTS

| JP | 10-106599 A | 4/1998 |
| JP | 2004-68685 A | 3/2004 |

(Continued)

OTHER PUBLICATIONS

International Search Report dated May 21, 2019, issued in counterpart International Application No. PCT/JP2019/005344, with English Translation. (4 pages).

(Continued)

*Primary Examiner* — Olatunji A Godo
(74) *Attorney, Agent, or Firm* — WHDA, LLP

(57) ABSTRACT

A fuel cell system that comprises an SOFC that generates power as a result of an oxide gas being supplied to an air electrode and a fuel gas being supplied to a fuel electrode, a plurality of exhaust fuel gas discharge lines that discharge, into the atmosphere, exhaust fuel gas that has been discharged from the fuel electrode, exhaust fuel gas discharge valves that are respectively provided to the plurality of exhaust fuel gas discharge lines, a plurality of exhaust oxide gas discharge lines that discharge, into the atmosphere, exhaust oxide gas that has been discharged from the air electrode, exhaust oxide gas discharge valves that are respectively provided to the plurality of exhaust oxide gas discharge lines, and a control device that, when stopping the SOFC, closes the exhaust oxide gas discharge valves before the exhaust fuel gas discharge valves.

9 Claims, 8 Drawing Sheets

(51) Int. Cl.
  *H01M 8/04303* (2016.01)
  *H01M 8/04014* (2016.01)
  *H01M 8/04111* (2016.01)
  *H01M 8/04746* (2016.01)
  *H01M 8/1213* (2016.01)
  *H01M 8/2425* (2016.01)
  *H01M 8/12* (2016.01)

(52) U.S. Cl.
  CPC ... *H01M 8/04303* (2016.02); *H01M 8/04761* (2013.01); *H01M 8/1213* (2013.01); *H01M 8/2425* (2013.01); *H01M 2008/1293* (2013.01)

(56) References Cited

U.S. PATENT DOCUMENTS

2015/0288009 A1* 10/2015 Manabe ............. H01M 8/04111
                                                        429/446
2016/0126570 A1*  5/2016 Nagai ............... H01M 8/04432
                                                        137/560

FOREIGN PATENT DOCUMENTS

| | | |
|---|---|---|
| JP | 2013-89455 A | 5/2013 |
| JP | 2013-175342 A | 9/2013 |
| JP | 2013-182720 A | 9/2013 |
| JP | 2014-165072 A | 9/2014 |
| JP | 2016-91816 A | 5/2016 |
| JP | 2016-95940 A | 5/2016 |
| JP | 2017-147124 A | 8/2017 |
| JP | 2018-6002 A | 1/2018 |
| JP | 2018-32472 A | 3/2018 |

OTHER PUBLICATIONS

Notification of Reasons for Refusal dated Aug. 28, 2019, issued in counterpart of KR Patent Application No. 10-2018-0110366 with English Translation (13 pages).

* cited by examiner

FUEL CELL SYSTEM, HYBRID POWER GENERATION SYSTEM, AND CONTROL METHOD FOR FUEL CELL SYSTEM

TECHNICAL FIELD

The present invention relates to a fuel cell system, a hybrid power generation system, and a control method for a fuel cell system.

BACKGROUND ART

Fuel cells that generate power by chemically reacting a fuel gas and an oxide gas are known. Among these, a solid oxide fuel cell (SOFC) is a fuel cell that uses ceramics such as zirconia ceramics as an electrolyte, and is operated using a gas such as a coal gasified gas produced by a gasification facility from a carbonaceous feedstock, a hydrogen, a city gas, a natural gas, petroleum, methanol, or the like as a fuel gas. In the SOFC, an oxide gas is supplied to an air electrode, and a fuel gas is supplied to a fuel electrode provided across an electrolyte. Such an SOFC is capable of generating power with high power generation efficiency by constructing a hybrid power generation system in combination with an internal combustion engine such as a gas turbine or a micro gas turbine (hereinafter, referred to as "MGT").

Some SOFCs are operated in a pressurized state with an internal pressure of 0.1 MPa to approximately 3 MPa, and when the SOFC is stopped, a vent line of the system on the exhaust fuel gas side from the fuel electrode outlet and the system on the exhaust oxide gas side from the air electrode outlet are opened, the exhaust fuel gas and the exhaust oxide gas in each system are discharged to the outside of the system, and the pressure inside the SOFC is reduced. When stopping the SOFC, the differential pressure between the fuel electrode side system and the air electrode side system (hereinafter, referred to as "fuel-air differential pressure") in the SOFC is set to be within a predetermined range so as not to damage the cell (for example, PTL 1).

PTL 1 discloses a fuel cell system including a pressure equalizing discharge line in which a fuel gas vent line and an oxide gas vent line communicate with each other. In this system, a system differential pressure between the fuel electrode side and the air electrode side is equalized by the pressure equalizing discharge line.

CITATION LIST

Patent Literature

[PTL 1] Japanese Unexamined Patent Application Publication No. 2016-95940

SUMMARY OF INVENTION

Technical Problem

In the system of PTL 1, a catalytic combustor is provided in the pressure equalizing discharge line to perform combustion process of a combustible gas in the exhaust fuel gas. However, similar to PTL 1, in the pressure equalizing discharge line in which the exhaust oxide gas and the exhaust fuel gas communicate with each other, combustion process must be performed while suppressing rapid combustion of combustible gas components in the exhaust fuel gas, and there is a possibility that the system configuration is complicated and the installation space increases. This tendency is remarkable when the size of the SOFC system increases, and there is a possibility that the size of the system configuration for performing the combustion process of the fuel gas increases and the combustion process becomes more complicated. Accordingly, there is a possibility that the installation space area of the entire SOFC system increases and the installation costs increase.

The present invention has been made in view of such circumstances, and an object thereof is to provide a fuel cell system, a hybrid power generation system, and a control method for a fuel cell system which can perform appropriate differential pressure control of a fuel electrode side system and an air electrode side system in a fuel cell, can achieve simplicity and suppress installation space, and can suppress installation costs.

Solution to Problem

In order to solve the above-described problems, a fuel cell system, a hybrid power generation system, and a control method for a fuel cell system of the present invention employ the following means.

According to an aspect of the present invention, there is provided a fuel cell system including: a fuel cell that includes an air electrode, a solid electrolyte, and a fuel electrode and that generates power as a result of an oxide gas being supplied to the air electrode and a fuel gas being supplied to the fuel electrode; a plurality of exhaust fuel gas discharge lines that discharge, to the outside of a system, an exhaust fuel gas that has been discharged from the fuel electrode; exhaust fuel gas discharge valves that are respectively provided to the plurality of exhaust fuel gas discharge lines; a plurality of exhaust oxide gas discharge lines that discharge, to the outside of the system, an exhaust oxide gas that has been discharged from the air electrode; exhaust oxide gas discharge valves that are respectively provided to the plurality of exhaust oxide gas discharge lines; and a control device that, when stopping the fuel cell, opens the exhaust oxide gas discharge valves before the exhaust fuel gas discharge valves.

Since the fuel cell operates in a pressurized state, in a case of stopping the operation, it is necessary to discharge gas from the system (hereinafter, referred to as "air electrode side exhaust system") on the exhaust oxide gas side from the air electrode outlet of the fuel cell, and the system (hereinafter, referred to as "fuel electrode side exhaust system") on the exhaust fuel gas side from the fuel electrode outlet, and to reduce the pressure inside the air electrode and inside the fuel electrode.

In the above-described configuration, the plurality of exhaust fuel gas discharge lines are provided, and each exhaust fuel gas discharge line is provided with the exhaust fuel gas discharge valves. Accordingly, by changing the opening degree (including the fully open state and the fully closed state) of each exhaust fuel gas discharge valve, it is possible to change the flow rate of the flowing fuel gas for each exhaust fuel gas discharge line. In this manner, since the flow rate of the fuel gas discharged to the outside of the system can be changed and adjusted by the plurality of exhaust fuel gas discharge lines, compared to a structure in which the flow rate of the fuel gas is adjusted by the single exhaust fuel gas discharge line, it is possible to finely adjust the decompression speed of the fuel electrode side exhaust system. In addition, the plurality of exhaust oxide gas discharge lines are provided, and each exhaust oxide gas discharge line is provided with the exhaust oxide gas discharge valves. Therefore, similar to the exhaust fuel gas discharge line, it is possible to finely adjust the decompression speed of the air electrode side exhaust system.

In this manner, when stopping the fuel cell, it is possible to adjust the decompression speed from the fuel electrode side exhaust system and the air electrode side exhaust system. Accordingly, when stopping the fuel cell, in the system (hereinafter, referred to as "air electrode side system") on the oxide gas side including the inside of the air electrode of the fuel cell and the system (hereinafter, referred to as "fuel electrode side system") on the fuel gas side including the inside of the fuel electrode of the fuel cell, it is possible to perform decompression in a state where the fuel-air differential pressure between the fuel electrode side system and the air electrode side system is suppressed within a predetermined range. Therefore, it becomes possible to suppress damage to the fuel cell system due to the differential pressure between the fuel electrode side system and the air electrode side system.

Further, since the exhaust fuel gas discharge line and the exhaust oxide gas discharge line include a plurality of lines provided in parallel, redundancy can be provided for a structure for discharging the fuel gas and the oxide gas to the outside of the system. Therefore, even when one discharge line of the exhaust fuel gas discharge line and the exhaust oxide gas discharge line becomes unusable due to damage or the like, the other discharge line can discharge the fuel gas or the oxide gas to the outside of the system. Therefore, the reliability of the fuel cell system can be improved.

Further, the air electrode side exhaust system has a greater volume than that of the fuel electrode side exhaust system. Therefore, in a case where the amount of gas existing in the system in the air electrode side exhaust system is greater than that in the fuel electrode side system and the flow rates of gas discharged to the outside of the system are almost the same in the systems, the pressure in the air electrode is unlikely to drop. In the above-described configuration, the exhaust oxide gas discharge valve opens before the exhaust fuel gas discharge valve. Accordingly, the discharge from the air electrode side exhaust system where the pressure is unlikely to decrease is performed before the fuel electrode side exhaust system, and the pressure starts to drop. In this manner, the pressure of the air electrode side exhaust system, of which the pressure is unlikely to decrease, decreases first, and then the pressure of the fuel electrode side exhaust system, of which the pressure is likely to decrease, decreases, and thus, it is possible to suppress the fuel-air differential pressure between the fuel electrode side system and the air electrode side system within a predetermined range.

Further, by setting the decompression speed of the fuel electrode side exhaust system to be decompressed later to be substantially the same as the decompression speed of the air electrode side exhaust system, the fuel-air differential pressure during the decompression can be set to be within a predetermined range. In this manner, when the fuel electrode side system is decompressed, the decompression speed of the air electrode side exhaust system can be set as a target speed, the decompression is possible so as to follow the target speed, and thus, it is possible to facilitate the decompression control of the fuel electrode side system. Therefore, it is also possible to facilitate control of the fuel-air differential pressure between the fuel electrode side system and the air electrode side system.

In addition, since the pressure is reduced from the air electrode side exhaust system, the pressure of the fuel electrode side exhaust system becomes higher than the pressure of the air electrode side exhaust system when the fuel cell is decompressed. Accordingly, the inflow of the oxide gas from the air electrode side system to the fuel electrode side system can be suppressed. Therefore, it is possible to prevent the fuel cell from being deteriorated or damaged due to the inflow of the oxide gas into the fuel electrode side system.

Further, since only a plurality of normally existing exhaust fuel gas discharge lines and exhaust oxide gas discharge lines are provided, it is possible to easily realize a structure for suppressing the fuel-air differential pressure within a predetermined range. Therefore, it is not necessary to perform combustion process for suppressing the rapid combustion of the combustible gas component in the exhaust fuel gas, to suppress the installation space of the entire fuel cell system, and to suppress the installation costs.

In the fuel cell system according to the aspect of the present invention, differential pressure measuring means for measuring a differential pressure between an air electrode side system which is a system on the air electrode side and a fuel electrode side system which is a system on the fuel electrode side, in the fuel cell, may further be provided, the plurality of exhaust fuel gas discharge lines may include a first exhaust fuel gas discharge line provided with a first exhaust fuel gas discharge valve, and a second exhaust fuel gas discharge line provided in parallel with the first exhaust fuel gas discharge line and provided with a second exhaust fuel gas discharge valve, the plurality of exhaust oxide gas discharge lines may include a first exhaust oxide gas discharge line provided with a first exhaust oxide gas discharge valve, and a second exhaust oxide gas discharge line provided in parallel with the first exhaust oxide gas discharge line and provided with a second exhaust oxide gas discharge valve, and the control device may perform control to change the second exhaust fuel gas discharge valve and/or the second exhaust oxide gas discharge valve to a predetermined opening degree based on the differential pressure measured by the differential pressure measuring means in a state where the first exhaust fuel gas discharge valve and the first exhaust oxide gas discharge valve are opened when stopping the fuel cell.

In the above-described configuration, in the exhaust fuel gas discharge line and the exhaust oxide gas discharge line, while one discharge line (the first exhaust fuel gas discharge line and the first exhaust oxide gas discharge line) among the plurality of discharge lines performs the discharge, the opening degree of the discharge valve provided in the other discharge line (the second exhaust fuel gas discharge line and the second exhaust oxide gas discharge line) is changed to a predetermined opening degree (a fully open state and a fully closed state) based on the fuel-air differential pressure. In a case where the opening degree of the discharge valve provided in the other discharge line is increased, the decompression speed of the exhaust system on the electrode side connected to the discharge line increases, and in a case where the opening degree of the discharge valve is reduced, the decompression speed of the exhaust system on the electrode side connected to the discharge line is reduced. In this manner, the decompression speed of each exhaust system can be changed and set. Accordingly, it becomes possible to suppress the fuel-air differential pressure between the fuel electrode side system and the air electrode side system when stopping the fuel cell within a predetermined range. In addition, in the above-described configuration, since such control is performed based on the fuel-air differential pressure by changing the exhaust flow rate from the air electrode side exhaust system and the fuel electrode side exhaust system, it becomes possible to more suitably suppress the fuel-air differential pressure.

In the fuel cell system according to the aspect of the present invention, a driving source for driving the first exhaust fuel gas discharge valve and a driving source for driving the second exhaust fuel gas discharge valve may be different from each other, and a driving source for driving the first exhaust oxide gas discharge valve and a driving source for driving the second exhaust oxide gas discharge valve may be different from each other.

In the above-described configuration, two types of valves having different driving sources can be provided in the exhaust fuel gas discharge line and the exhaust oxide gas discharge line. Accordingly, redundancy can be provided for the structure for discharging the exhaust fuel gas and the exhaust oxide gas to the outside of the system. Therefore, even in a case where one of the driving sources fails to operate due to a failure or the like, the valve unit driven by the other driving source is driven, and accordingly, it is possible to reliably perform the discharge of the exhaust fuel gas and the exhaust oxide gas to the outside of the system.

In the fuel cell system according to the aspect of the present invention, the control device may include a determination unit that determines whether or not the differential pressure measured by the differential pressure measuring means is equal to or greater than a predetermined threshold value, a judgment unit that judges which of the air electrode side system and the fuel electrode side system is higher in pressure, in a case where the determination unit determines that the differential pressure is equal to or greater than the predetermined threshold value, and a discharge valve control unit that sets an opening degree of the discharge valve, which is provided on the system side judged to have a higher pressure by the judgment unit, out of the second exhaust fuel gas discharge valve and the second exhaust oxide gas discharge valve, to be greater than a current opening degree.

In the above-described configuration, in a case where the differential pressure measured by the differential pressure measuring means is higher than the predetermined threshold value, the opening degree of the discharge valve provided in the discharge line of the exhaust system at the system side outlet of which pressure is judged to be high is greater than the current opening degree. Accordingly, it is possible to increase the decompression speed on the system side of which pressure is judged to be high, and reduce the fuel-air differential pressure between the fuel electrode side system and the air electrode side system.

In addition, increasing the opening degree also includes changing the fully closed state to the fully open state.

In the fuel cell system according to the aspect of the present invention, the first exhaust fuel gas discharge valve and the first exhaust oxide gas discharge valve may be valves that are changeable to a predetermined opening degree, and when stopping the fuel cell, based on the differential pressure measured by the differential pressure measuring means, the control device may change an opening degree of the first exhaust fuel gas discharge valve and/or the first exhaust oxide gas discharge valve, and change a flow rate of a gas discharged from the first exhaust fuel gas discharge line and/or the second exhaust oxide gas discharge line.

In the above-described configuration, by changing the opening degree of the first exhaust fuel gas discharge valve and the first exhaust oxide gas discharge valve, it is possible to set the flow rate of the gas to be discharged to change, and adjust the decompression speed of each system. In this manner, since the first exhaust fuel gas discharge valve and the first exhaust oxide gas discharge valve can suppress the fuel-air differential pressure between the fuel electrode side system and the air electrode side system when stopping the fuel cell within a predetermined range, it is possible to reduce the number of times of driving the second exhaust fuel gas discharge valve and the second exhaust oxide gas discharge valve.

In the fuel cell system according to the aspect of the present invention, pressure measuring means for measuring a pressure of an air electrode side system which is a system on the air electrode side and a fuel electrode side system which is a system on the fuel electrode side, in the fuel cell, may further be provided, the plurality of exhaust fuel gas discharge lines may include a first exhaust fuel gas discharge line provided with a first exhaust fuel gas discharge valve, and a second exhaust fuel gas discharge line provided in parallel with the first exhaust fuel gas discharge line and provided with a second exhaust fuel gas discharge valve, the plurality of exhaust oxide gas discharge lines may include a first exhaust oxide gas discharge line provided with a first exhaust oxide gas discharge valve, and a second exhaust oxide gas discharge line provided in parallel with the first exhaust oxide gas discharge line and provided with a second exhaust oxide gas discharge valve, the first exhaust fuel gas discharge valve and the first exhaust oxide gas discharge valve may be valves that are changeable to a predetermined set opening degree, and when stopping the fuel cell, in a case where the pressure of the air electrode side system is equal to or less than a predetermined threshold value, the control device may change opening degrees of the first exhaust fuel gas discharge valve and the first exhaust oxide gas discharge valve to be greater.

In the above-described configuration, when stopping the fuel cell, the pressure of the fuel cell is gradually reduced. Accordingly, when stopping the fuel cell, the pressure in the fuel cell does not decrease sharply, and thus, it is possible to reduce a rapid change in the fuel-air differential pressure generated in the fuel cell. In addition, by gradually reducing the pressure, it is possible to facilitate the control of the differential pressure.

According to another aspect of the present invention, there is provided a hybrid power generation system including: the above-described fuel cell system; and a gas turbine device including a turbine, a generator connected to the turbine, a combustor for feeding a combustion gas to the turbine, and a compressor capable of supplying the oxide gas to the combustor and the air electrode, in which a part of the exhaust fuel gas discharged from the fuel electrode of the fuel cell is supplied to the combustor, and in which the oxide gas compressed by the compressor is supplied to the air electrode of the fuel cell, and at least a part of the exhaust oxide gas discharged from the air electrode is supplied to the combustor.

According to a still another aspect of the present invention, there is provided a hybrid power generation system including: the above-described fuel cell system; a turbocharger device including a turbine and a compressor connected to the turbine and capable of supplying the oxide gas to the air electrode; and a combustor for feeding a combustion gas to the turbine, in which at least a part of the combustion gas of the exhaust fuel gas discharged from the fuel electrode of the fuel cell is supplied to the combustor, and in which the oxide gas compressed by the compressor is supplied to the air electrode of the fuel cell, and at least a part of the exhaust oxide gas discharged from the air electrode is supplied to the combustor.

According to still another aspect of the present invention, there is provided a control method for a fuel cell system including a fuel cell that generates power as a result of an oxide gas being supplied to an air electrode and a fuel gas being supplied to a fuel electrode provided while interposing a solid electrolyte between the air electrode and the fuel electrode, in which the fuel cell system includes a plurality of exhaust fuel gas discharge lines that are capable of discharging, to the outside of a system, an exhaust fuel gas that has been discharged from the fuel electrode, exhaust fuel gas discharge valves that are respectively provided to the plurality of exhaust fuel gas discharge lines, a plurality of exhaust oxide gas discharge lines that are capable of discharging, to the outside of the system, an exhaust oxide gas that has been discharged from the air electrode, and exhaust oxide gas discharge valves that are respectively provided to the plurality of exhaust oxide gas discharge lines, in which the method includes: a first step of opening the exhaust oxide gas discharge valve when stopping the fuel cell, and a second step of opening the exhaust fuel gas discharge valves after the first step.

Advantageous Effects of Invention

According to the present invention, it is possible to perform appropriate differential pressure control of the fuel electrode side system and the air electrode side system of the fuel cell system in the fuel cell, achieve simplicity and reduce installation space of the fuel cell system, and suppress installation costs.

DESCRIPTION OF EMBODIMENTS

Hereinafter, an embodiment of a fuel cell system, a hybrid power generation system, and a control method for a fuel cell system according to the present invention will be described with reference to the drawings. In the present embodiment, an example in which a solid oxide fuel cell (SOFC) is applied as a fuel cell will be described.

In the following, for convenience of description, the positional relationship between each of the configuration elements described using the expressions "up" and "down" on the paper surface indicates a perpendicularly upper side and a perpendicularly lower side, respectively. Further, in the present embodiment, regarding the up-down direction and the horizontal direction which can obtain the same effect, for example, the up-down direction on the paper surface is not necessarily limited to the perpendicularly up-down direction, and the direction may correspond to the horizontal direction orthogonal to the perpendicular direction.

In the following, although a cylindrical cell stack will be described as an example of a cell stack of the solid oxide fuel cell (SOFC), the cell stack is not necessarily limited thereto, and may be, for example, a flat cell stack. A fuel battery cell is formed on a base, but the electrode (fuel electrode or air electrode) may be formed to be thick without the base, and may also serve as the base.

Figure 1:
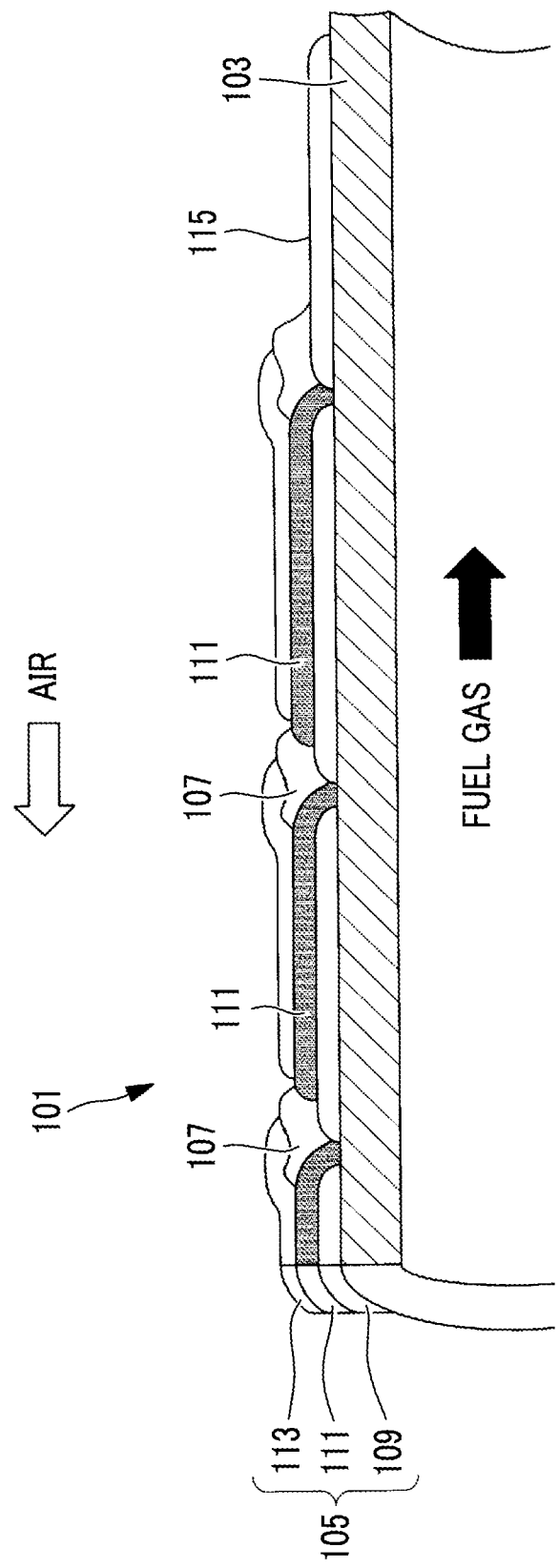
FIG. 1 illustrates an aspect of a cell stack according to an embodiment of the present invention.

First, a cylindrical cell stack using a base tube will be described as an example according to the present embodiment with reference to FIG. 1. Here, FIG. 1 illustrates an aspect of the cell stack according to the embodiment of the present invention. A cell stack 101 includes a cylindrical base tube 103, a plurality of fuel battery cells 105 formed on an outer peripheral surface of the base tube 103, and an interconnector 107 formed between the fuel battery cells 105 adjacent to each other. The fuel battery cell 105 is formed by stacking a fuel electrode 109, a solid electrolyte 111, and an air electrode 113. The cell stack 101 includes a lead film 115 electrically connected via the interconnector 107 to the air electrode 113 of the fuel battery cell 105 formed at one end at the endmost of the base tube 103 in an axial direction, and a lead film 115 electrically connected to the fuel electrode 109 of the fuel battery cell 105 formed at the other end at the endmost, in the plurality of fuel battery cells 105 formed on the outer peripheral surface of the base tube 103.

The base tube 103 is made of a porous material, for example, CaO stabilized $ZrO_2$ (CSZ), a mixture (CSZ+NiO) of CSZ and nickel oxide (NiO), $Y_2O_3$ stabilized $ZrO_2$ (YSZ), $MgAl_2O_4$ or the like as main components. The base tube 103 supports the fuel battery cell 105, the interconnector 107, and the lead film 115, and diffuses the fuel gas supplied to the inner peripheral surface of the base tube 103 to the fuel electrode 109 formed on the outer peripheral surface of the base tube 103 through pores of the base tube 103.

The fuel electrode 109 is made of an oxide of a composite material of Ni and a zirconia-based electrolyte material, for example, Ni/YSZ is used. The thickness of the fuel electrode 109 is 50 to 250 µm, and the fuel electrode 109 may be formed by screen-printing slurry. In this case, the fuel electrode 109 has Ni which is a component of the fuel electrode 109 and has a catalytic action on the fuel gas. The catalytic action is performed by reacting the fuel gas, for example, a mixed gas of methane ($CH_4$) and steam, supplied through the base tube 103, and modifies hydrogen ($H_2$) and carbon monoxide (CO). Further, the fuel electrode 109 electrochemically reacts hydrogen ($H_2$) and carbon monoxide (CO) obtained by modification with oxygen ions ($O^{2-}$) supplied through the solid electrolyte 111, in the vicinity of an interface with the solid electrolyte 111, and generates water ($H_2O$) and carbon dioxide ($CO_2$). At this time, the fuel battery cell 105 generates power by electrons emitted from oxygen ions.

Examples of the fuel gas that can be supplied to the fuel electrode 109 of the SOFC 10 and used include gas produced by a gasification facility from a carbonaceous raw material such as coal, methanol, and petroleum, in addition to hydrogen ($H_2$), hydrocarbon gas such as carbon monoxide (CO) or methane ($CH_4$), city gas, and natural gas.

As the solid electrolyte 111, YSZ having airtightness that makes it difficult for gas to pass and high oxygen ion conductivity at high temperature is mainly used. The solid electrolyte 111 transfers oxygen ions ($O^{2-}$) generated at the air electrode to the fuel electrode. The film thickness of the solid electrolyte 111 positioned on the surface of the fuel electrode 109 is 10 to 100 µm, and the solid electrolyte 111 may be formed by screen-printing slurry.

The air electrode 113 is made of, for example, a LaSrMnO$_3$-based oxide or a LaCoO$_3$-based oxide, and the air electrode 113 is applied with slurry by screen-printing or using a dispenser. The air electrode 113 dissociates oxygen in the oxide gas such as air to be supplied in the vicinity of the interface with the solid electrolyte 111 and generates oxygen ions ($O^{2-}$).

The air electrode 113 can also have a two-layer configuration. In this case, the air electrode layer (air electrode intermediate layer) on the solid electrolyte 111 side is made of a material having high ionic conductivity and excellent catalytic activity. The air electrode layer (air electrode conductive layer) on the air electrode intermediate layer may be made of a perovskite type oxide represented by Sr and Ca-doped LaMnO3. By doing so, it is possible to further improve the power generation performance.

The oxide gas is a gas containing approximately 15% to 30% of oxygen, and representatively, air is suitable. However, in addition to air, a mixed gas of combustion exhaust gas and air, a mixed gas of oxygen and air, and the like can be used.

The interconnector 107 is made of a conductive perovskite type oxide represented by $M_{1-x}L_xTiO_3$ (M is an alkaline earth metal element and L is a lanthanoid element) such as SrTiO$_3$, and screen-prints the slurry. The interconnector 107 is a dense film such that the fuel gas and the oxide gas do not mix with each other. Further, the interconnector 107 has stable durability and electric conductivity under both an oxidizing atmosphere and a reducing atmosphere. The interconnector 107 electrically connects the air electrode 113 of one fuel battery cell 105 and the fuel electrode 109 of the other fuel battery cell 105 in the fuel battery cells 105 adjacent to each other, and connects the fuel battery cells 105 adjacent to each other in series.

Since the lead film 115 needs to have electron conductivity and to have a similar thermal expansion coefficient to that of other materials constituting the cell stack 101, the lead film 115 is made of a composite material of Ni and zirconia-based electrolyte material such as Ni/YSZ or M1−xLxTiO$_3$ (M is an alkaline earth metal element and L is a lanthanoid element) such as SrTiO$_3$. The lead film 115 derives DC power generated by the plurality of fuel battery cells 105 connected to each other in series by the interconnector, to the vicinity of the end portion of the cell stack 101.

The base tube 103 on which the slurry film of the fuel electrode 109, the solid electrolyte 111, and the interconnector 107 is formed is co-sintered in the atmosphere. The sintering temperature is specifically set at 1350° C. to 1450° C.

Next, the base tube 103 in which the slurry film of the air electrode 113 is formed is sintered in the atmosphere on the co-sintered base tube 103. The sintering temperature is specifically set at 1100° C. to 1250° C. The sintering temperature here is lower than the co-sintering temperature after forming the base tube 103 to the interconnector 107.

Figure 2:
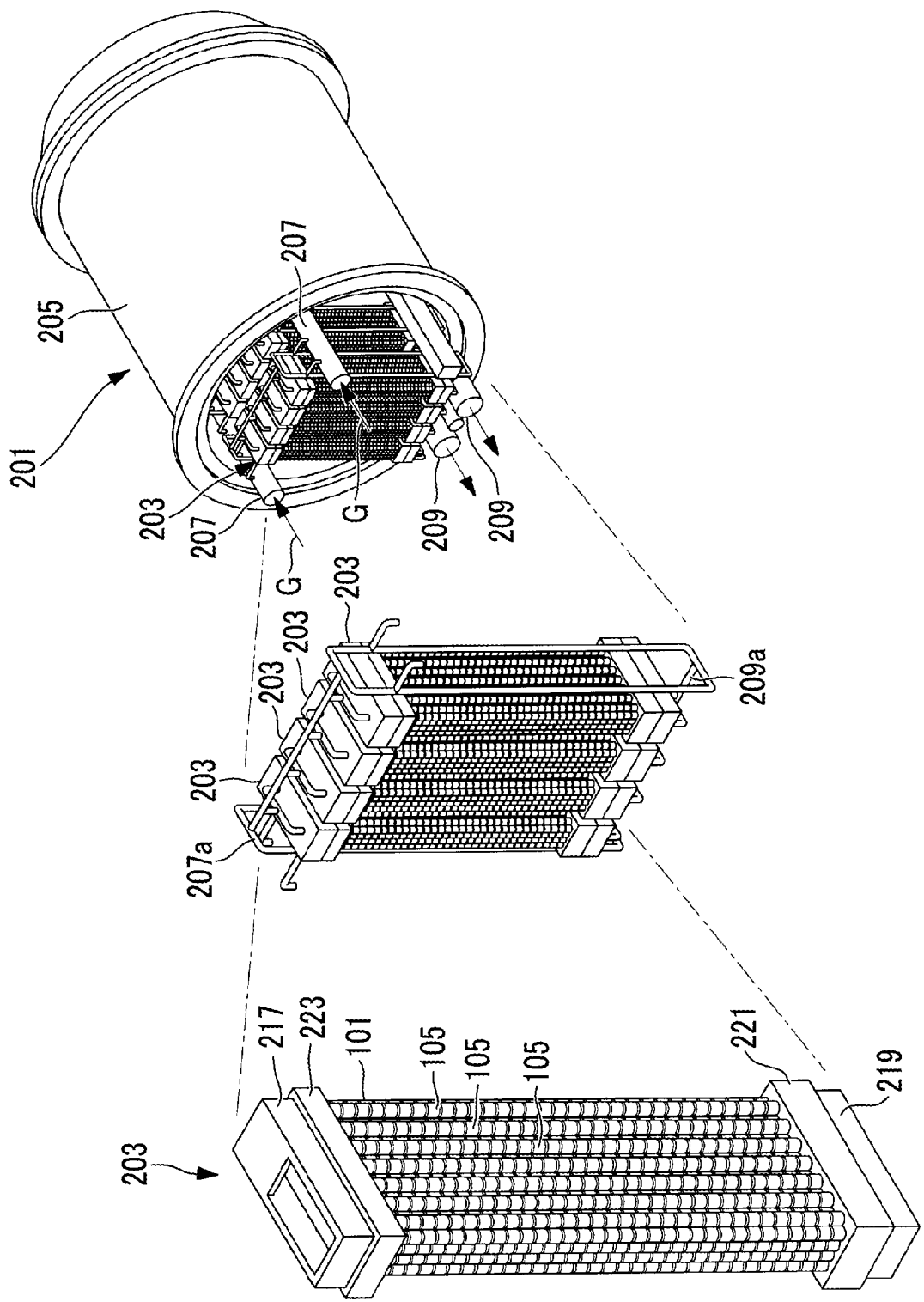
FIG. 2 illustrates an aspect of an SOFC module according to the embodiment of the present invention.
Figure 3:
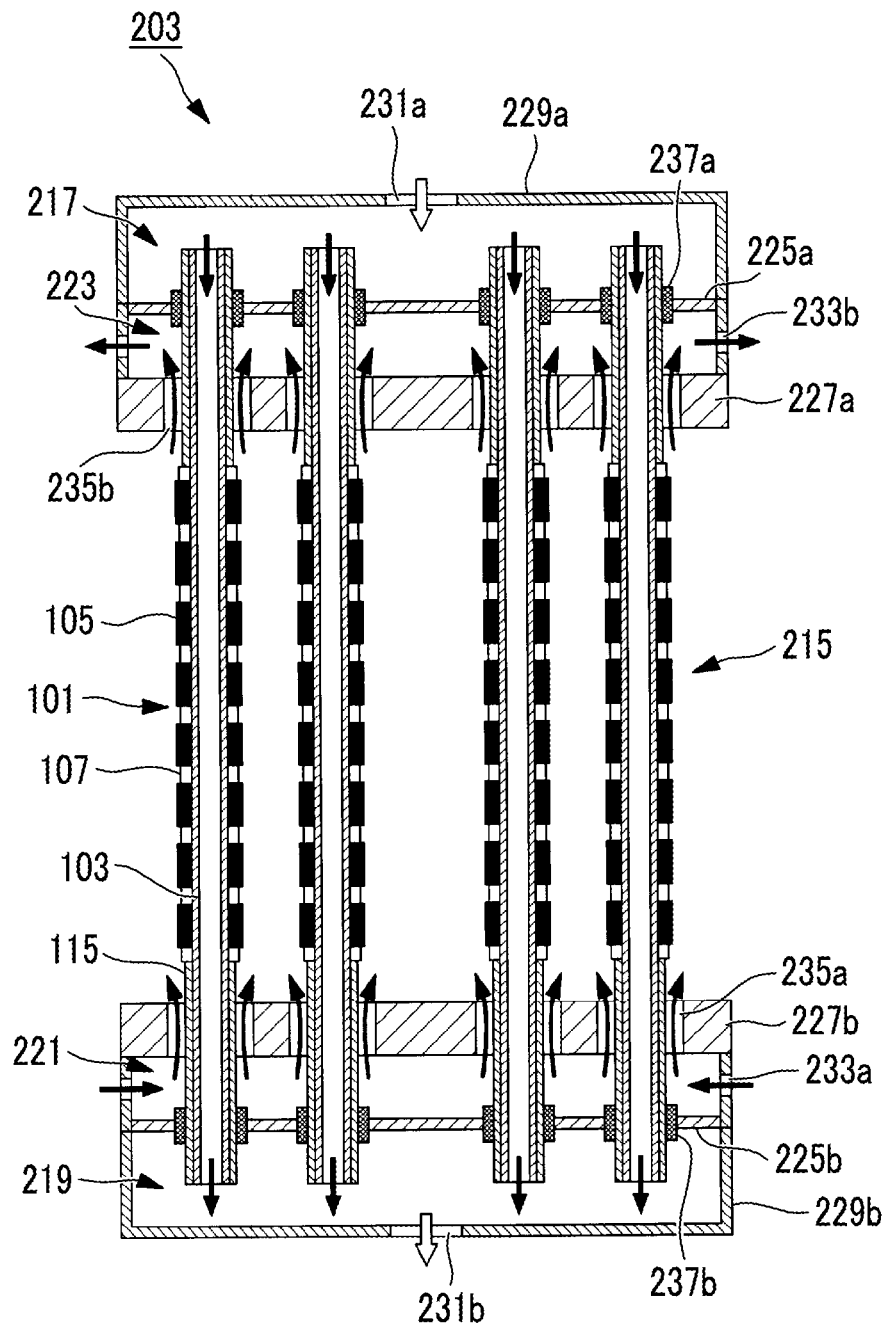
FIG. 3 illustrates an aspect of a cross section of an SOFC cartridge according to the embodiment of the present invention.

Next, an SOFC module and an SOFC cartridge according to the present embodiment will be described with reference to FIGS. 2 and 3. Here, FIG. 2 illustrates an aspect of the SOFC module according to the embodiment. In addition, FIG. 3 illustrates a sectional view of an aspect of the SOFC cartridge according to the embodiment.

As illustrated in FIG. 2, an SOFC module 201 includes, for example, a plurality of SOFC cartridges 203 and a pressure vessel 205 that stores the plurality of SOFC cartridges 203 therein. In addition, although a cylindrical SOFC cell stack is described as an example in FIG. 2, the cell stack is not limited thereto, and may be, for example, a flat cell stack. Further, the SOFC module 201 includes a fuel gas supply pipe 207, a plurality of fuel gas supply branch pipes 207a, a fuel gas discharge pipe 209, and a plurality of fuel gas discharge branch pipes 209a. The SOFC module 201 includes an oxide gas supply pipe (not illustrated), an oxide gas supply branch pipe (not illustrated), an oxide gas discharge pipe (not illustrated), and a plurality of oxide gas discharge branch pipes (not illustrated).

The fuel gas supply pipe 207 is provided on the outside of the pressure vessel 205, connected to a fuel gas supply unit that supplies a fuel gas having a predetermined gas composition and a predetermined flow rate in accordance with the amount of power generation of the SOFC module 201, and connected to the plurality of fuel gas supply branch pipes 207a. The fuel gas supply pipe 207 branches the predetermined flow rate of fuel gas supplied from the above-described fuel gas supply unit to the plurality of fuel gas supply branch pipes 207a, and guides the fuel gas. In addition, the fuel gas supply branch pipe 207a is connected to the fuel gas supply pipe 207 and connected to the plurality of SOFC cartridges 203. The fuel gas supply branch pipe 207a guides the fuel gas supplied from the fuel gas supply pipe 207 to the plurality of SOFC cartridges 203 at a substantially uniform flow rate, and makes the power generation performance of the plurality of SOFC cartridges 203 substantially uniform.

The fuel gas discharge branch pipe 209a is connected to the plurality of SOFC cartridges 203 and to the fuel gas discharge pipe 209. The fuel gas discharge branch pipe 209a guides the exhaust fuel gas discharged from the SOFC cartridge 203 to the fuel gas discharge pipe 209. Further, the fuel gas discharge pipe 209 is connected to the plurality of fuel gas discharge branch pipes 209a, and a part thereof is disposed on the outside of the pressure vessel 205. The fuel gas discharge pipe 209 guides the exhaust fuel gas derived from the fuel gas discharge branch pipe 209a at a substantially equal flow rate to the outside of the pressure vessel 205.

Since the pressure vessel 205 is operated at an internal pressure of 0.1 MPa to approximately 3 MPa and an internal temperature of the atmospheric temperature to approximately 550° C., a material that maintains a proof stress and a corrosion resistance with respect to oxygen containing gas, such as oxygen contained in the oxide gas, is used. For example, a stainless steel material such as SUS304 is suitable.

Here, in the present embodiment, an aspect in which the plurality of SOFC cartridges 203 are assembled and stored in the pressure vessel 205 is described, but the present invention is not limited thereto, and an aspect in which the SOFC cartridges 203 are not assembled and stored in the pressure vessel 205 can also be employed.

As illustrated in FIG. 3, the SOFC cartridge 203 includes a plurality of cell stacks 101, a power generation chamber 215, a fuel gas supply chamber 217, a fuel gas discharge chamber 219, an oxide gas supply chamber 221, and an oxide gas discharge chamber 223. In addition, the SOFC cartridge 203 includes an upper tube plate 225a, a lower tube plate 225b, an upper heat insulator 227a, and a lower heat insulator 227b. In the present embodiment, the SOFC cartridge 203 has a structure in which the fuel gas supply chamber 217, the fuel gas discharge chamber 219, the oxide gas supply chamber 221, and the oxide gas discharge chamber 223 are arranged as illustrated in FIG. 3 such that the fuel gas and the oxide gas flow while facing the inner side and the outer side of the cell stack 101, but the structure is not necessary, and for example, the gas may flow while being parallel to the inner side and the outer side of the cell stack and the oxide gas may flow in the direction orthogonal to the longitudinal direction of the cell stack.

The power generation chamber 215 is a region formed between the upper heat insulator 227a and the lower heat insulator 227b. The power generation chamber 215 is a region where the fuel battery cells 105 of the cell stack 101 are arranged, and is a region where power is generated by electrochemically reacting the fuel gas and the oxide gas. The temperature in the vicinity of the center portion of the power generation chamber 215 in the longitudinal direction of the cell stack 101 is monitored by a temperature sensor or the like, and a high-temperature atmosphere of approximately 700° C. to 1000° C. is achieved during the steady operation of the SOFC module 201.

The fuel gas supply chamber 217 is a region surrounded by an upper casing 229a and an upper tube plate 225a of the SOFC cartridge 203, and communicates with the fuel gas supply branch pipe 207a through a fuel gas supply hole 231a provided in an upper portion of the upper casing 229a. Further, the plurality of cell stacks 101 are joined to the upper tube plate 225a by a seal member 237a, and the fuel gas supply chamber 217 guides the fuel gas supplied from the fuel gas supply branch pipe 207a through the fuel gas supply hole 231a at a substantially uniform flow rate on the inside of the base tube 103 of the plurality of cell stacks 101, and makes the power generation performance of the plurality of cell stacks 101 substantially uniform.

The fuel gas discharge chamber 219 is a region surrounded by a lower casing 229b and the lower tube plate 225b of the SOFC cartridge 203, and communicates with the fuel gas discharge branch pipe 209a through a fuel gas discharging hole 231b provided in the lower casing 229b. In addition, the plurality of cell stacks 101 are joined to the lower tube plate 225b by a seal member 237b, and the fuel gas discharge chamber 219 collects the exhaust fuel gas that passes through the inside of the base tube 103 of the plurality of cell stacks 101 and supplied to the fuel gas discharge chamber 219, and guides the exhaust fuel gas to the fuel gas discharge branch pipe 209a through the fuel gas discharging hole 231b.

An oxide gas having a predetermined gas composition and a predetermined flow rate is branched into the oxide gas supply branch pipe in accordance with the power generation amount of the SOFC module 201 and supplied to a plurality of SOFC cartridges 203. The oxide gas supply chamber 221 is a region surrounded by the lower casing 229b, the lower tube plate 225b, and the lower heat insulator 227b of the SOFC cartridge 203, and communicates with the oxide gas supply branch pipe (not illustrated) through an oxide gas supply hole 233a provided on a side surface of the lower casing 229b. The oxide gas supply chamber 221 guides a predetermined flow rate of oxide gas supplied from the oxide gas supply branch pipe (not illustrated) through the oxide gas supply hole 233a, to the power generation chamber 215 through an oxide gas supply gap 235a which will be described later.

The oxide gas discharge chamber 223 is a region surrounded by the upper casing 229a, the upper tube plate 225a, and the upper heat insulator 227a of the SOFC cartridge 203, and communicates with an oxide gas discharge branch pipe (not illustrated) through an oxide gas discharging hole 233b provided on the side surface of the upper casing 229a. The oxide gas discharge chamber 223 guides the exhaust oxide gas supplied from the power generation chamber 215 to the oxide gas discharge chamber 223 through an oxide gas discharge gap 235b which will be described later, to the oxide gas discharge branch pipe (not illustrated) through the oxide gas discharging hole 233b.

The upper tube plate 225a is fixed to the side plate of the upper casing 229a such that the upper tube plate 225a, the top plate of the upper casing 229a, and the upper heat insulator 227a are substantially parallel to each other, between the top plate of the upper casing 229a and the upper heat insulator 227a. The upper tube plate 225a has a plurality of holes corresponding to the number of the cell stacks 101 provided in the SOFC cartridge 203, and the cell stacks 101 are respectively inserted into the holes. The upper tube plate 225a airtightly supports one end portion of the plurality of cell stacks 101 via one or both of a seal member and an adhesive member, and further isolates the fuel gas supply chamber 217 and the oxide gas discharge chamber 223 from each other.

The upper heat insulator 227a is disposed at the lower end portion of the upper casing 229a such that the upper heat insulator 227a, the top plate of the upper casing 229a, and the upper tube plate 225a are substantially parallel to each other, and is fixed to the side plate of the upper casing 229a. The upper heat insulator 227a has a plurality of holes corresponding to the number of cell stacks 101 provided in the SOFC cartridge 203. The diameter of the hole is set to be greater than the outer diameter of the cell stack 101. The upper heat insulator 227a includes an oxide gas discharge gap 235b formed between the inner surface of the hole and the outer surface of the cell stack 101 inserted into the upper heat insulator 227a.

The upper heat insulator 227a separates the power generation chamber 215 and the oxide gas discharge chamber 223 from each other, the temperature of the atmosphere around the upper tube plate 225a increases, and the strength deterioration or an increase in corrosion due to the oxygen containing gas contained in the oxide gas is suppressed. The upper tube plate 225a and the like are made of a high-temperature durable metallic material such as Inconel, but thermal deformation is prevented since the upper tube plate 225a and the like are exposed to the high temperature in the power generation chamber 215 and the temperature difference in the upper tube plate 225a and the like increases. In addition, the upper heat insulator 227a guides the exhaust oxide gas that has passed through the power generation chamber 215 and has been exposed to the high temperature, to the oxide gas discharge chamber 223 through the oxide gas discharge gap 235b.

According to the present embodiment, due to the structure of the above-described SOFC cartridge 203, the fuel gas and the oxide gas flow while facing the inner side and the outer side of the cell stack 101.

Accordingly, the exhaust oxide gas exchanges heat with the fuel gas supplied to the power generation chamber 215 through the inside of the base tube 103, is cooled to the temperature at which deformation such as buckling of the upper tube plate 225a and the like made of a metallic material does not occur, and is supplied to the oxide gas discharge chamber 223. Further, the temperature of the fuel gas increases by the heat exchange with the exhaust oxide gas discharged from the power generation chamber 215, and the fuel gas is supplied to the power generation chamber 215. As a result, it is possible to supply the fuel gas preheated to a temperature suitable for power generation without using a heater or the like, to the power generation chamber 215.

The lower tube plate 225b is fixed to the side plate of the lower casing 229b such that the lower tube plate 225b, the bottom plate of the lower casing 229b, and the lower heat insulator 227b are substantially parallel to each other, between the bottom plate of the lower casing 229b and the lower heat insulator 227b. The lower tube plate 225b has a plurality of holes corresponding to the number of the cell stacks 101 provided in the SOFC cartridge 203, and the cell stacks 101 are respectively inserted into the holes. The lower tube plate 225b airtightly supports the other end portion of the plurality of cell stacks 101 via one or both of a seal member and an adhesive member, and further isolates the fuel gas discharge chamber 219 and the oxide gas supply chamber 221 from each other.

The lower heat insulator 227b is disposed at the upper end portion of the lower casing 229b such that the lower heat insulator 227b, the bottom plate of the lower casing 229b, and the lower tube plate 225b are substantially parallel to each other, and is fixed to the side plate of the lower casing 229b. The lower heat insulator 227b has a plurality of holes corresponding to the number of cell stacks 101 provided in the SOFC cartridge 203. The diameter of the hole is set to be greater than the outer diameter of the cell stack 101. The lower heat insulator 227b includes the oxide gas supply gap 235a formed between the inner surface of the hole and the outer surface of the cell stack 101 inserted into the lower heat insulator 227b.

The lower heat insulator 227b separates the power generation chamber 215 and the oxide gas supply chamber 221 from each other, the temperature of the atmosphere around the lower tube plate 225b increases, and the strength deterioration or an increase in corrosion due to the oxygen containing gas contained in the oxide gas is suppressed. The lower tube plate 225b and the like are made of a high-temperature durable metallic material such as Inconel, but thermal deformation is prevented since the lower tube plate 225b and the like are exposed to the high temperature and the temperature difference in the lower tube plate 225b and the like increases. In addition, the lower heat insulator 227b guides the oxide gas supplied to the oxide gas supply chamber 221 to the power generation chamber 215 through the oxide gas supply gap 235a.

According to the present embodiment, due to the structure of the above-described SOFC cartridge 203, the fuel gas and the oxide gas flow while facing the inner side and the outer side of the cell stack 101. Accordingly, the exhaust fuel gas that has passed through the power generation chamber 215 exchanges heat with the oxide gas supplied to the power generation chamber 215 through the inside of the base tube 103, is cooled to the temperature at which deformation such as buckling of the lower tube plate 225b and the like made of a metallic material does not occur, and is supplied to the fuel gas discharge chamber 219. In addition, the temperature of the oxide gas increases by the heat exchange with the exhaust fuel gas, and is supplied to the power generation chamber 215. As a result, it is possible to supply the oxide gas of which the temperature has increased to a temperature necessary for power generation without using a heater or the like, to the power generation chamber 215.

After the DC power generated in the power generation chamber 215 is derived to the vicinity of the end portion of the cell stack 101 by the lead film 115 made of Ni/YSZ or the like provided in the plurality of fuel battery cells 105, the DC power is collected to a power collection rod (not illustrated) of the SOFC cartridge 203 through a power collection plate (not illustrated), and is taken out to the outside of each of the SOFC cartridges 203. The DC power derived to the outside of the SOFC cartridge 203 by the power collection rod connects the generated power of each SOFC cartridge 203 to a predetermined serial number and parallel number, is derived to the outside of the SOFC module 201, exchanges heat with a predetermined AC power by a power conversion device (such as an inverter) such as a power conditioner and the like (not illustrated), and is supplied to a power supply destination (for example, load equipment or a power system).

As described above, in an SOFC 313 of the present embodiment, the supplied fuel gas mainly flows through the internal space and the like of the cell stack 101. Meanwhile, the supplied oxide gas (air) mainly flows through the power generation chamber 215 of the SOFC cartridge 203 and the internal space of the pressure vessel 205 which correspond to the outside of the cell stack 101. In the air electrode side exhaust system, the capacity of the air electrode side system is greater than the capacity of the fuel electrode side system.

A schematic configuration of a power generation system according to an embodiment of the present invention will be described.

Figure 4:
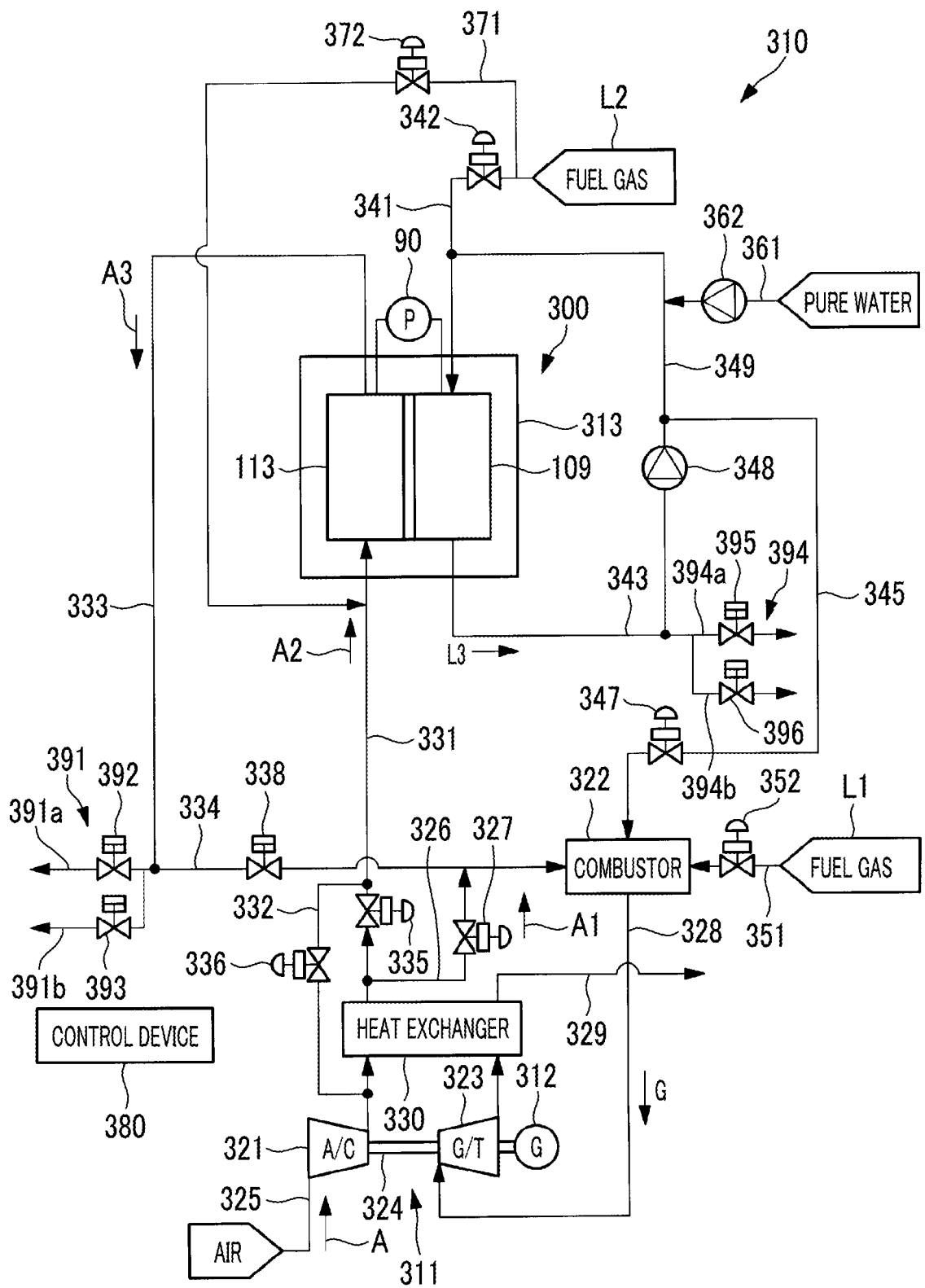
FIG. 4 illustrates an aspect of a power generation system according to the embodiment of the present invention.

FIG. 4 is a schematic configuration view illustrating a schematic configuration of a hybrid power generation system (hereinafter, referred to as a "power generation system") 310 according to the embodiment of the present invention. As illustrated in FIG. 4, the power generation system 310 includes a micro gas turbine (gas turbine device, hereinafter referred to as "MGT") 311, a generator 312, and a fuel cell system 300 having the SOFC 313. The SOFC 313 is configured by combining one or a plurality of SOFC modules (not illustrated), and is hereinafter simply referred to as "SOFC". The power generation system 310 is configured to obtain high power generation efficiency by combining power generation by the MGT 311 and power generation by the SOFC 313.

In the present embodiment, a system using the micro gas turbine (MGT) 311 is described, but a turbocharger may be used instead of the MGT 311. The MGT 311 rotates the turbine 323 by a combustion gas G, compresses an air A by a compressor 321 and generates power by the generator 312, and recovers the energy of the combustion gas G.

In the turbocharger (not illustrated), the turbine 323 is rotated by the combustion gas G, and the compressor 321 compresses the air A to recover the energy of the combustion gas G.

The MGT 311 includes a compressor 321, a combustor 322, and a turbine 323, and the compressor 321 and the turbine 323 are connected to each other by a rotary shaft 324 so as to be integrally rotatable. The compressor 321 is rotationally driven by rotation of the turbine 323 which will be described later. The compressor 321 compresses the air A taken in from an air intake line 325.

An air A1, which is at least a part of the air A from the compressor 321, is supplied to the combustor 322 through a first oxide gas supply line 326, and a fuel gas L1 is supplied through a first fuel gas supply line 351. The first oxide gas supply line 326 is provided with a control valve 327 for adjusting the amount of air A1 supplied to the combustor 322, and the first fuel gas supply line 351 is provided with a control valve 352 for adjusting the flow rate of the fuel gas supplied to the combustor 322. Furthermore, a part of an exhaust fuel gas L3 circulating through a fuel gas recirculation line 349 of the SOFC 313 which will be described later is supplied to the combustor 322 through an exhaust fuel gas supply line 345. The exhaust fuel gas supply line 345 is provided with a control valve 347 for adjusting the amount of exhaust fuel gas supplied to the combustor 322. Furthermore, a part of an exhaust air A3 used in the air electrode 113 of the SOFC 313 is supplied to the combustor 322 through an exhaust oxide gas supply line 334 which will be described later.

The combustor 322 mixes and combusts the fuel gas L1, a part of the air A (air A1), the exhaust fuel gas L3, and the exhaust air A3 to generate the combustion gas G. The combustion gas G is fed to the turbine 323 through the combustion gas supply line 328. The turbine 323 is rotated by the adiabatic expansion of the combustion gas G, and the exhaust gas is discharged from a combustion exhaust gas line 329. The generator 312 is provided coaxially with the turbine 323, and generates power by rotating the turbine 323.

The fuel gas L1 to be supplied to the combustor 322 and a fuel gas L2 which will be described later are combustible gases, and for example, a gas obtained by vaporizing liquefied natural gas (LNG) or natural gas, city gas, hydrogen ($H_2$), carbon monoxide (CO), hydrocarbon gases such as methane ($CH_4$), and a gas produced by a gasification facility from carbonaceous raw materials (petroleum, coal, and the like) are used. The fuel gas refers to a fuel gas of which calorific value has been adjusted to be substantially constant in advance.

A heat exchanger 330 exchanges heat between the exhaust gas discharged from the turbine 323 and the air A supplied from the compressor 321. After being cooled by heat exchange with the air A, the exhaust gas is discharged to the outside through a stack (not illustrated).

The SOFC 313 generates power by reacting at a predetermined operating temperature by supplying the fuel gas L2 as a reducing agent and the air A2 as an oxygen containing gas. The SOFC 313 is constituted of an SOFC module (not illustrated) and contains an aggregate of the plurality of cell stacks provided in the pressure vessel of the SOFC module, and the fuel electrode 109, the air electrode 113, and the solid electrolyte 111 are provided in the cell stack (not illustrated).

The SOFC 313 generates power by supplying the air A2 to the air electrode 113 and supplying the fuel gas L2 to the fuel electrode 109, and converts the power to a predetermined AC power by a power conversion device (such as an inverter) such as a power conditioner (not illustrated). In the embodiment, a case where at least a part (air A2) of the air A compressed by the compressor 321 is adopted as the oxide gas supplied to the SOFC 313 will be described as an example.

In addition, the SOFC 313 includes a differential pressure gauge (differential pressure measuring means, pressure measuring means) 90. The differential pressure gauge 90 measures a fuel-air differential pressure, which is a differential pressure between the fuel electrode side system and the air electrode side system, in the SOFC 13. Further, in addition to the absolute value of the fuel-air differential pressure, the differential pressure gauge 90 detects which of the fuel electrode side system and the air electrode side system has a higher pressure. Further, the differential pressure gauge 90 detects the respective pressure values of the fuel electrode side system and the air electrode side system. Information measured or detected by the differential pressure gauge 90 is transmitted to a control device 380 which will be described later.

To the SOFC 313, the air A2 is supplied as an oxide gas to an oxide gas introduction unit (not illustrated) of the air electrode 113 through a second oxide gas supply line 331 branched from the first oxide gas supply line 326. The second oxide gas supply line 331 is provided with a control valve 335 for adjusting the flow rate of the supplied air A2. In the first oxide gas supply line 326, a heat exchanger 330 is provided on the upstream side (that is, on the compressor 321 side) of the air A2 from the branch point of the second oxide gas supply line 331. In the heat exchanger 330, the air A exchanges heat with the exhaust gas discharged from the combustion exhaust gas line 329 and the temperature thereof increases.

Furthermore, a bypass line 332 that bypasses the heat exchanger 330 is provided in the second oxide gas supply line 331. A control valve 336 is provided in the bypass line 332 such that the bypass flow rate of the air A can be adjusted. By controlling the opening degree of the control valves 335 and 336 by the control device 380 which will be described later, the flow rate ratio between the air A passing through the heat exchanger 330 and the air A bypassing the heat exchanger 330 is adjusted, and the temperature of the air A2 supplied to the SOFC 313 through the second oxide gas supply line 331, which is a part of the air A, is adjusted. The upper limit of the temperature of the air A2 supplied to the SOFC 313 is limited so as not to damage the materials of the respective components on the inside of the SOFC module (not illustrated) constituting the SOFC 313.

Furthermore, an air electrode fuel supply line 371 for supplying the fuel gas L2 as a combustible gas is connected to the second oxide gas supply line 331. The air electrode fuel supply line 371 is provided with a control valve 372 for adjusting the amount of fuel gas supplied to the second oxide gas supply line 331. The supply amount of the fuel gas L2 added to the air A2 is adjusted by controlling the valve opening degree of the control valve 372 by the control device 380 which will be described later. The amount of the fuel gas L2 added to the air A2 is supplied at an inflammable limit concentration or lower, more preferably at 3% by volume or lower.

Figure 5:
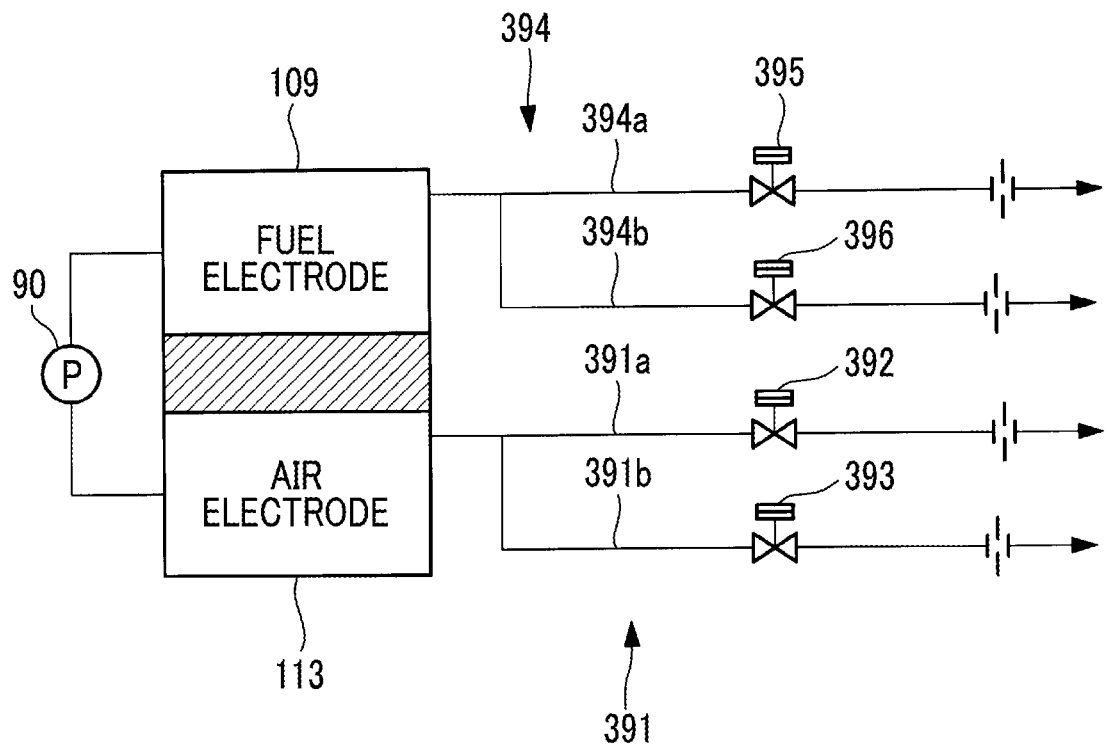
FIG. 5 illustrates an aspect of a main part of the power generation system according to the embodiment of the present invention.

An exhaust oxide gas line 333 that discharges the exhaust air A3 from the outlet of the air electrode 113 is connected to the SOFC 313. The exhaust oxide gas line 333 is branched into the exhaust oxide gas supply line 334 for supplying the exhaust air A3 to the combustor 322 and an exhaust oxide gas discharge line 391 for making it possible to discharge a part of the exhaust air A3 from the outlet of the air electrode 113 to the atmosphere (outside the system). The exhaust oxide gas supply line 334 is provided with a shutoff valve 338 for disconnecting a system between the SOFC 313 and the MGT 311. The plurality of (for example, two in the present embodiment) exhaust oxide gas discharge lines 391 are provided. In the present embodiment, specifically, the plurality of exhaust oxide gas discharge lines 391 include: a first exhaust oxide gas discharge line 391a provided with a first exhaust oxide gas discharge valve 392; and a second exhaust oxide gas discharge line 391b provided with a second exhaust oxide gas discharge valve 393 in parallel with the first exhaust oxide gas discharge line 391a (also refer to FIG. 5). The flow path cross-sectional area of the first exhaust oxide gas discharge line 391a and the flow path cross-sectional area of the second exhaust oxide gas discharge line 391b are set to be substantially the same such that the flow rate can be similarly controlled even when using any of the exhaust oxide gas discharge lines.

In the present embodiment, the first exhaust oxide gas discharge valve 392 is a motor valve driven by a motor (not illustrated), and is a shutoff valve that can change the flow rate coefficient by stopping an opening degree command in the middle and by locking the valve opening degree in the middle, and can change the flow rate of the exhaust air A3 that flows on the inside to a predetermined flow rate by changing the opening degree to a predetermined opening degree. The second exhaust oxide gas discharge valve 393 is a pneumatic on-off valve (a shutoff valve that can be set to a predetermined opening degree) driven by compressed air compressed by a compressor (not illustrated). The first exhaust oxide gas discharge valve 392 and the second exhaust oxide gas discharge valve 393 can change and set the flow rate of the exhaust air A3 discharged to the atmosphere. In the present embodiment, the first exhaust oxide gas discharge valve 392 and the second exhaust oxide gas discharge valve 393 reduce the costs by using the shutoff valve, but the valve is not limited to the shutoff valve, and a flow regulation valve may be used.

The SOFC 313 is further connected to a second fuel gas supply line 341 for supplying the fuel gas L2 to a fuel gas introduction unit (not illustrated) of the fuel electrode 109, and an exhaust fuel gas line 343 that discharges the exhaust fuel gas L3 after being used for the reaction in the fuel electrode 109. The second fuel gas supply line 341 is provided with a control valve 342 for adjusting the flow rate of the fuel gas L2 supplied to the fuel electrode 109.

Further, the exhaust fuel gas line 343 is branched into the fuel gas recirculation line 349 for recirculating the exhaust fuel gas L3 to the fuel gas introduction unit of the fuel electrode 109 of the SOFC 313, and an exhaust fuel gas discharge line 394 for discharging the exhaust fuel gas L3 used for the fuel electrode 109 to the atmosphere (outside of the system). The fuel gas recirculation line 349 is provided with a recirculation blower 348 for recirculating the exhaust fuel gas L3. The plurality of (for example, two in the present embodiment) exhaust fuel gas discharge lines 394 are provided. Specifically, the plurality of exhaust fuel gas discharge lines 394 include: a first exhaust fuel gas discharge line 394a provided with a first exhaust fuel gas discharge valve 395; and a second exhaust fuel gas discharge line 394b provided with a second exhaust fuel gas discharge valve 396 in parallel with the first exhaust fuel gas discharge line 394a and (also refer to FIG. 5). The flow path cross-sectional area of the first exhaust fuel gas discharge line 394a and the flow path cross-sectional area of the second exhaust fuel gas discharge line 394b are set to be substantially the same such that the flow rate can be similarly controlled even when using any of the exhaust fuel gas discharge lines.

The first exhaust fuel gas discharge valve 395 is a motor valve driven by a motor (not illustrated), and is a shutoff valve that can change the flow rate coefficient by stopping an opening degree command in the middle and by stopping and holding the valve opening degree in the middle, and can change the flow rate of the exhaust fuel gas L3 that flows on the inside by changing the opening degree to a predetermined opening degree. The second exhaust fuel gas discharge valve 396 is a pneumatic on-off valve (a shutoff valve that can be set to a predetermined opening degree) driven by compressed air compressed by a compressor (not illustrated). The first exhaust fuel gas discharge valve 395 and the second exhaust fuel gas discharge valve 396 change the flow rate of the exhaust fuel gas L3 discharged to the atmosphere. In addition, the first exhaust fuel gas discharge valve 395 and the second exhaust fuel gas discharge valve 396 reduce the costs by using the shutoff valve, but the valve is not limited to the shutoff valve, and a flow regulation valve may be used.

The first exhaust oxide gas discharge valve 392, the second exhaust oxide gas discharge valve 393, the first exhaust fuel gas discharge valve 395, and the second exhaust fuel gas discharge valve 396 can quickly adjust the pressure that has become excessively high by discharging the exhaust fuel gas L3 or the exhaust air A3 to the atmosphere. When stopping the SOFC 313, the differential pressure (hereinafter, referred to as fuel-air differential pressure) between the fuel electrode 109 and the air electrode 113 of the SOFC 313 is controlled by the first exhaust oxide gas discharge valve 392, the second exhaust oxide gas discharge valve 393, the first exhaust fuel gas discharge valve 395, and the second exhaust fuel gas discharge valve 396 such that the differential pressure on the fuel electrode 109 side increases (for example, a pressure difference on the fuel electrode 109 side increases by 0.1 kPa to 30 kPa) within a predetermined pressure range.

Furthermore, the fuel gas recirculation line 349 is provided with a pure water supply line 361 for supplying pure water in a case where water for modifying the fuel gas L2 is insufficient in the fuel electrode 109. The pure water supply line 361 is provided with a pump 362. By controlling the discharge flow rate of the pump 362 by the control device 380, the amount of pure water supplied to the fuel electrode 109 is adjusted.

Figure 6:
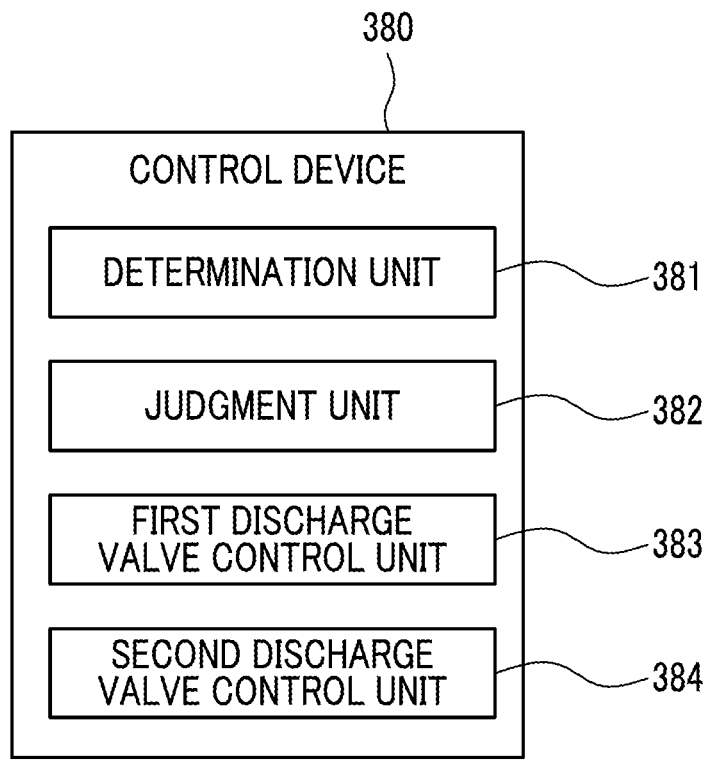
FIG. 6 is a block diagram illustrating an aspect of a control device according to the embodiment of the present invention.

The control device 380 controls each valve based on, for example, measurement values of a differential pressure gauge 90, a pressure gauge, each temperature sensor, a flow meter, and the like provided in the power generation system (hybrid power generation system) 310. As illustrated in FIG. 6, the control device 380 includes: a determination unit 381 that determines whether or not the fuel-air differential pressure measured by the differential pressure gauge 90 is equal to or greater than a predetermined threshold value; a judgment unit 382 that judges which of the air electrode side system and the fuel electrode side system is higher in pressure, in a case where the determination unit 381 determines that the fuel-air differential pressure is equal to or greater than the predetermined threshold value; a first discharge valve control unit 383 that increases the opening degree of the first exhaust fuel gas discharge valve and the first exhaust oxide gas discharge valve, in a case where the pressure of the air electrode side system measured by the differential pressure gauge 90 is equal to or less than a predetermined threshold value with respect to the pressure of the fuel electrode side system; and a second discharge valve control unit 384 that increases the opening degree of the discharge valve, which is provided in the exhaust system of the system side outlet of which the pressure is judged to be high by the judgment unit 382, out of the second exhaust fuel gas discharge valve 396 and the second exhaust oxide gas discharge valve 393, to be greater than the current opening degree.

The control device 380 includes, for example, a central processing unit (CPU), a random access memory (RAM), a read only memory (ROM), and a computer-readable storage medium. For example, a series of processes for realizing various functions are stored in a storage medium or the like in the form of a program as an example, the CPU reads the program into a RAM or the like and executes information processing and arithmetic processing, and accordingly, various functions are realized. The program may be installed in advance in the ROM or other storage medium, provided in a state of being stored in a computer-readable storage medium, or delivered via wired or wireless communication means. The computer-readable storage medium is a magnetic disk, a magneto-optical disk, a CD-ROM, a DVD-ROM, a semiconductor memory, or the like.

The molar ratio of steam to carbon in the fuel gas is called steam carbon ratio (S/C). In the vicinity of the system inlet on the fuel electrode 109 side of the SOFC 313, the S/C needs to be stoichiometrically equal to or greater than 1.0 in order to perform internal modification of the fuel, and further, there is a concern that the carbon content is precipitated when there is a region where the S/C is low in the vicinity of the cell stack (not illustrated). It is preferable that S/C 3.0 in order to prevent carbon precipitation and promote the modification rate. Meanwhile, when the S/C is extremely large, the steam content in the exhaust gas finally discharged to the outside of the power generation system 310 increases, the latent heat component is discharged to the outside as a wasteful amount of heat, and the system efficiency deteriorates. Due to this, it is desirable to be able to set an appropriate amount of S/C that does not become excessive in accordance with the operating state of the S/C, during the rated operation of the SOFC 313, for example, the S/C is 3.0 to 5.0, preferably to be 3.5 to 5.0.

In a case where the recirculation of the exhaust fuel gas L3 via the fuel gas recirculation line 349 is performed, when the S/C of the fuel gas L2 supplied to the SOFC 313 by the second fuel gas supply line 341 is lower than a specified value (for example, S/C is 3.0 to 5.0), by supplying the pure water to the second fuel gas supply line 341 through the pure water supply line 361 and by supplying the pure water as steam in the second fuel gas supply line 341, the sufficient steam is compensated. Further, when the flow rate of the fuel gas L2 supplied to the recirculation flow rate is small, such as at the time of activating or stopping the SOFC, the S/C becomes relatively high, and thus, the fuel gas L2 supplied to the SOFC 313 may increase and the pure water amount may be reduced.

Here, a method for activating the power generation system 310 of the present embodiment will be described with reference to FIG. 4. In a case of activating the power generation system 310, the SOFC 313 starts after the MGT 311 starts. When activating the power generation system 310, the control device 380 starts the MGT 311 first, stabilizes the output of the MGT 311 at a certain load (power generation output), and then supplies a part of the air A (air A2) supplied from the compressor 321 to the SOFC 313, and accordingly, it is possible to pressurize the air electrode 113 of the SOFC 313.

First, when activating the MGT 311, the compressor 321 compresses the air A, the combustor 322 mixes and combusts the air A1 and the fuel gas L1, the turbine 323 is rotated by the combustion gas G, and accordingly, the generator 312 starts power generation. In order to supply the entire amount of the air A to the combustor 322, it is preferable that the control valve 335, the control valve 336, the first exhaust oxide gas discharge valve 392, and the second exhaust oxide gas discharge valve 393 be fully closed.

When activating the SOFC 313, first, at least a part of the air A (air A2) is supplied to the air electrode 113 of the SOFC 313 to start increasing the pressure and start increasing the temperature. The first exhaust oxide gas discharge valve 392, the second exhaust oxide gas discharge valve 393, and the shutoff valve 338 are closed, and the control valve 327 is opened by a predetermined opening degree. Here, the opening degree for controlling the pressure increase speed is adjusted. The control valve 327 is maintained at a predetermined opening degree, and the control valve 336 is closed. Then, the air A2 which is at least a part of the air A compressed by the compressor 321 is supplied from the second oxide gas supply line 331 to the SOFC 313 side. The temperature of the air A2 is raised to 300 to 500° C. by the heat exchanger 330, and accordingly, the pressure of the SOFC 313 increases as the temperature thereof increases by the supply of the air A2.

Meanwhile, in the fuel electrode 109 of the SOFC 313, the pressure starts increasing by supplying an inert gas such as nitrogen to the fuel electrode side. In a state where the first exhaust fuel gas discharge valve 395, the second exhaust fuel gas discharge valve 396, and the control valve 347 are closed, and the recirculation blower 348 is stopped, the inert gas is supplied and the recirculation blower 348 of the fuel gas recirculation line 349 is driven at a predetermined timing. In addition, the recirculation blower 348 may be activated before the fuel electrode 109 side is pressurized. Then, the inert gas is supplied from the second fuel gas supply line 341 to the SOFC 313 side and is recirculated by the fuel gas recirculation line 349. Accordingly, the pressure on the SOFC 313 side increases due to the supply of the inert gas.

When the pressure on the air electrode 113 side of the SOFC 313 becomes equal to the outlet pressure of the compressor 321, the control valve 327 controls the flow rate of air supplied to the SOFC 313, and the shutoff valve 338 is opened to supply the exhaust air A3 from the SOFC 313 from the exhaust oxide gas supply line 334 to the combustor 322. The SOFC 313 and the MGT 311 are connected to each other, and a transition is made to a combined state where the air is supplied to the combustor 322 of the MGT 311 through the SOFC 313. At this time, the first exhaust oxide gas discharge valve 392 and/or the second exhaust oxide gas discharge valve 393 are also controlled to change the opening degree, and a part of the exhaust air A3 from the SOFC 313 may be discharged to the outside of the system. At the same time, control for changing the opening degree of the first exhaust fuel gas discharge valve 395 and/or the second exhaust fuel gas discharge valve 396 may be performed, and the inert gas from the SOFC 313 may be discharged to the outside of the system. In addition, when the pressure on the air electrode 113 side and the pressure on the fuel electrode 109 side in the SOFC 313 reach the target pressure, the pressure increase of the SOFC 313 is completed.

After the transition to the combined state, by adjusting the opening degree of the control valve 327 and the control valve 336, the flow rate of the air A2 supplied to the SOFC 313 is increased for increasing the temperature of the SOFC 313, and the flow rate of the air A1 supplied to the combustor 322 through the first oxide gas supply line 326 is reduced. Then, until the SOFC 313 starts power generation after the predetermined condition is satisfied, the entire amount of the air A may be controlled to pass through the SOFC 313, pass through the exhaust oxide gas supply line 334 from the exhaust oxide gas line 333, and be supplied to the combustor 322, and the temperature of the SOFC 313 may be quickly raised as uniform as possible.

Thereafter, after the pressure control of the SOFC 313 is stabilized, while the shutoff valve 338 is closed in a case where the first exhaust oxide gas discharge valve 392 and the second exhaust oxide gas discharge valve 393 are opened, the shutoff valve 338 is maintained to be open. Therefore, the exhaust air A3 from the SOFC 313 is continuously supplied from the exhaust oxide gas supply line 334 to the combustor 322.

The control device 380 executes a first temperature raising mode, a second temperature raising mode, and a load raising mode when activating the SOFC 313, and raises the power generation chamber temperature, which is the temperature around the cell stack (not illustrated), to the rated temperature, and the load (power generation output) is increased to the target load.

First, in the first temperature raising mode, by supplying the air A2 heated by the heat exchange by the heat exchanger 330 to the air electrode 113 as described above, the temperature of the power generation chamber including the air electrode 113 is increased. When the first temperature threshold value is reached in the first temperature raising mode, the mode is switched from the first temperature raising mode to the second temperature raising mode. Here, the first temperature threshold value is a temperature at which the air electrode 113 functions as a catalyst for a combustion reaction with the fuel gas L2 as a combustible gas, and is set, for example, in a range of approximately 400° C. to 450° C.

In the second temperature raising mode, similar to the first temperature raising mode, by supplying the air A2 to the air electrode 113, and by opening the control valve 372 provided in the air electrode fuel supply line 371, the fuel gas L2 is added and supplied to the air A2. At the air electrode 113 into which the air A2 and the fuel gas L2 flow, the fuel gas L2 is catalytically combusted at the air electrode 113 by the catalytic action of the air electrode 113 to generate the combustion heat. In this manner, in the second temperature raising mode, the air electrode 113 is raised using heat generated by catalytic combustion.

When the power generation chamber temperature reaches the second temperature threshold value, the control device 380 switches from the second temperature raising mode to the load raising mode.

In the load raising mode, in order to shorten the temperature raising time, similar to the first temperature raising mode, the air A2 is supplied to the air electrode 113, the fuel gas L2 is supplied to the fuel electrode 109 by opening the control valve 342 of the second fuel gas supply line 341, the pure water is supplied to the fuel electrode 109 by driving the pump 362 of the pure water supply line 361, and the power generation is started. In the load raising mode, the power generation chamber temperature is increased by heat generated by catalytic combustion by adding and supplying the fuel gas L2 to the air electrode 113 and heat generated by both power generation. In the load raising mode, after the power generation chamber temperature of the SOFC 313 increases until the temperature can be maintained by self-heating by power generation, the supply amount of the fuel gas L2 added and supplied to the air electrode 113 is gradually reduced, and for example, control is performed such that the addition and supply of the fuel gas L2 to the air electrode 113 becomes zero at the same time when the target load is reached.

The second temperature threshold value is set to be, for example, equal to or greater than 750° C. This is because, when the fuel gas L2 is injected into the fuel electrode 109 side when the fuel electrode 109 has not reached a sufficient temperature, the SOFC 313 generates power while the solid electrolyte 111 remains in a high resistance state, the electrode configuration material deteriorates due to the structural change, and performance deterioration of the SOFC 313 is caused, it is preferable to set the second temperature threshold value to be approximately 750° C. such that the performance deterioration of the SOFC 313 is unlikely to be caused.

When the component of the exhaust fuel gas L3 becomes a component that can be put into the combustor 322, while the first exhaust fuel gas discharge valve 395 and the second exhaust fuel gas discharge valve 396 are closed, the control valve 347 is opened. Then, the exhaust fuel gas L3 from the SOFC 313 is supplied to the combustor 322 from the exhaust fuel gas supply line 345. At this time, the amount of the fuel gas L1 supplied to the combustor 322 is reduced by the control valve 352 provided in the first fuel gas supply line 351.

In the load raising mode, when the power generation chamber temperature reaches the power generation chamber target temperature and the load reaches a target load such as a rated load, the activation is completed.

The power generation chamber target temperature is equal to or greater than the temperature at which the temperature can be maintained by self-heating due to the heat generated by power generation of SOFC 313, and is set to be, for example, 800 to 950° C.

In this manner, the power generation by the generator 312 by the driving of the MGT 311 and the power generation by the pressure raising, the temperature raising, and the activation of the SOFC 313 is performed, and the power generation system 310 operates in a steady state.

Here, a method for stopping the SOFC 313 according to the present embodiment will be described. In a case of stopping the SOFC 313, when the SOFC 313 is stopped normally or in an emergency, first, the supply of the fuel gas L2 to the fuel electrode 109 is continued, and the supply of the air A2 as the oxide gas to the air electrode 113 side is stopped.

In order to stop the SOFC 313, while the control valves 335, 336, and 347 and the shutoff valve 338 are closed to stop the combustor 322, the control valve 342 continues supplying the fuel gas L2 at a predetermined opening degree. In addition, the first exhaust oxide gas discharge valve 392 and the first exhaust fuel gas discharge valve 395 are opened at a predetermined timing, the second exhaust oxide gas discharge valve 393 or the second exhaust fuel gas discharge valve 396 are intermittently opened in accordance with the fuel-air differential pressure, and accordingly, the exhaust air A3 and the exhaust fuel gas L3 are discharged to the outside of the system, and the SOFC 313 is decompressed while maintaining a predetermined fuel-air differential pressure. At this time, the first exhaust oxide gas discharge valve 392 is opened before the first exhaust fuel gas discharge valve 395. In addition, the details of the process of discharging the exhaust air A3 and the exhaust fuel gas L3 to the outside of the system from the first exhaust oxide gas discharge valve 392 and the second exhaust oxide gas discharge valve 393, the first exhaust fuel gas discharge valve 395, and the second exhaust fuel gas discharge valve 396 will be described later.

When discharging the exhaust air A3 and the exhaust fuel gas L3 to the outside of the system, in the SOFC 313, while the supply of the air A2 to the air electrode 113 is stopped, the supply of the pure water is continued through the pure water supply line 361 when the fuel gas L2 and the S/C are less than a specified value (for example, S/C is 3.0 to 5.0) at a predetermined flow rate to the fuel electrode 109, and in a state where the reducing atmosphere of the fuel electrode is maintained, and the power generation is stopped. The fuel gas L2 and the pure water are supplied to the fuel electrode 109, and a part of the exhaust fuel gas L3 discharged from the fuel electrode 109 to the exhaust fuel gas line 343 is circulated to the fuel electrode 109 through the fuel gas recirculation line 349, and thus, it is possible to prevent an excessive pressure drop in the system on the fuel electrode side.

When the cooling of the temperature of the SOFC 313 advances and the temperature drops below a predetermined temperature, in order to prevent the reduction of the air electrode 113 due to the stoppage of power generation and the deterioration due to the oxidation of the fuel electrode 109, by purging the inert gas such as nitrogen to the system on the fuel electrode 109 side after the operation of the SOFC 313 is stopped, the SOFC 313 is protected. When the SOFC 313 is cooled to a predetermined temperature set in advance, while the control valve 342 is closed to stop the supply of the fuel gas L2, the first exhaust fuel gas discharge valve 395 and/or the second exhaust fuel gas discharge valve 396 are opened and a part of the exhaust fuel gas L3 is discharged to the outside of the system. In the SOFC 313, while a purge gas (inert gas) is supplied to the fuel electrode 109 from a purge gas supply line (not illustrated), the exhaust fuel gas L3 of the exhaust fuel gas line 343 and the fuel gas recirculation line 349 is discharged to the outside of the system from the first exhaust fuel gas discharge valve 395 and/or the second exhaust fuel gas discharge valve 396. Therefore, the reducing atmosphere of the fuel electrode 109 is replaced with the inert atmosphere in a short period of time by the purge gas. By replacing the atmosphere of the system on the fuel electrode 109 side with the inert gas, the material of the air electrode 113 can be prevented from being reduced due to the diffusion of the remaining fuel gas to the air electrode 113. Further, since the fuel gas is circulated to the fuel electrode 109 through the fuel gas recirculation line 349 while supplying the inert gas such as nitrogen to the system on the fuel electrode 109 side, it is possible to cool the SOFC 313 while preventing excessive pressure drop of the system on the fuel electrode side by discharging the exhaust fuel gas L3 to the outside of the system.

The inert gas supplied to the system on the fuel electrode 109 side is a nitrogen ($N_2$) gas, an argon (Ar) gas, a He (helium) gas, a combustion exhaust gas, or the like. The inert gas may be a mixed gas of $N_2$ gas and $H_2$ gas. The $H_2$ gas contained in the inert gas reacts with oxygen ($O_2$) diffused from the air electrode 113 side. Accordingly, by including the $H_2$ gas in the inert gas, the diffused oxygen can be prevented from reacting with the material of the fuel electrode 109.

In parallel with the supply of the inert gas to the system on the fuel electrode 109 side, a cooling gas is supplied from a cooling gas supply line (not illustrated) to the system on the air electrode 113 side. The cooling gas preferably contains oxygen. The temperature of the cooling gas is lower than the air A2 supplied to the SOFC 313 during power generation. The cooling gas is preferably outside air (room temperature air) or the like. The room temperature refers to a temperature of approximately 0° C. to 40° C. The cooling gas supply line (not illustrated) may be connected to, for example, the second oxide gas supply line 331 such that the cooling gas can be supplied to the air electrode 113 of the SOFC 313, and the cooling gas may be supplied by a compressor or a blower (not illustrated) which are separately provided in the cooling gas supply line.

Figure 7:
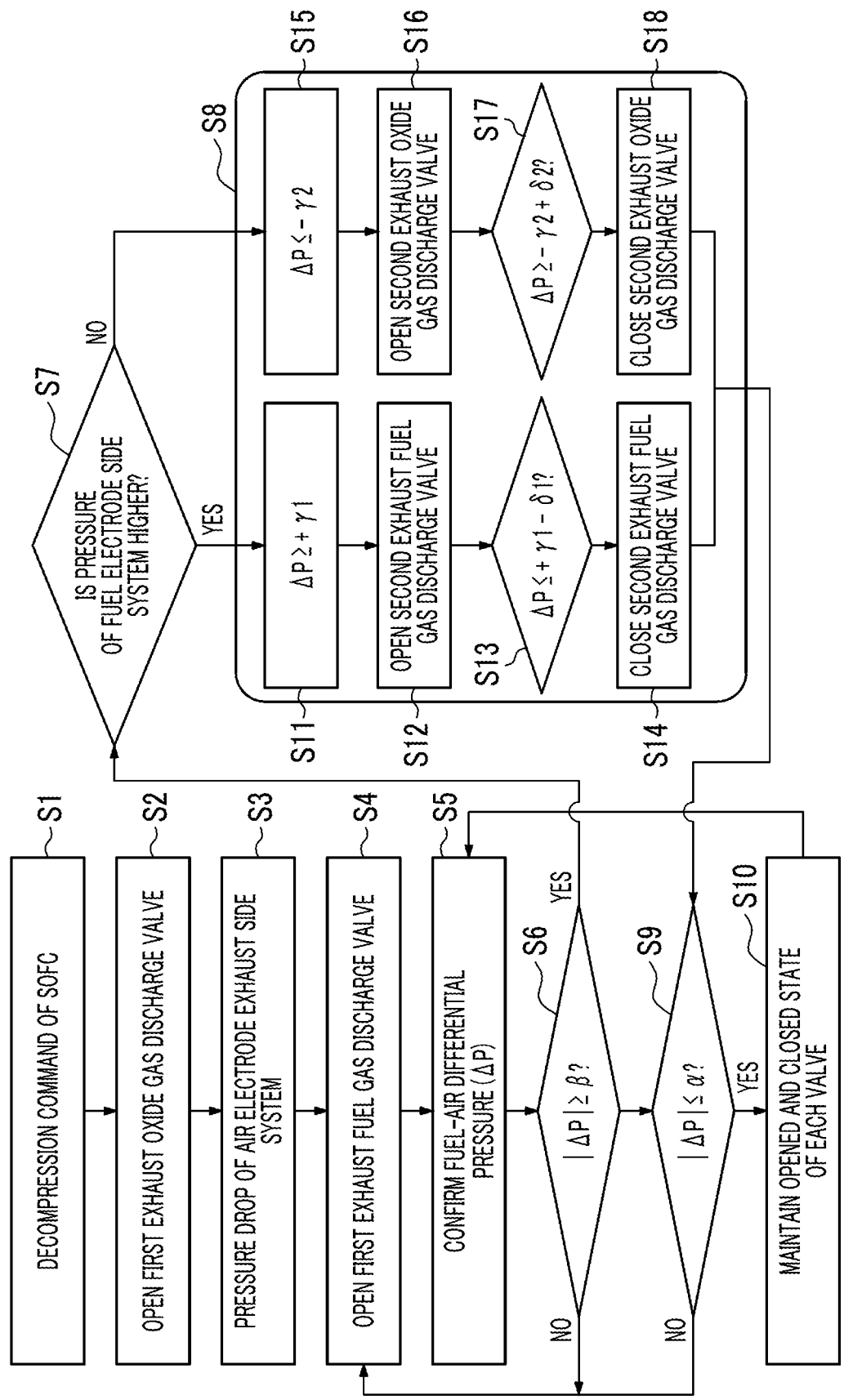
FIG. 7 is a flowchart illustrating a differential pressure control process of the power generation system according to the embodiment of the present invention.

Next, the differential pressure control process performed by the control device 380 when stopping the SOFC 313 will be described with reference to the flowchart of FIG. 7.

When the decompression command of the SOFC 313 is issued in S1, first, the first exhaust oxide gas discharge valve 392 is opened (S2). When the first exhaust oxide gas discharge valve 392 provided in the first exhaust oxide gas discharge line 391a is opened, the pressure of the air electrode side exhaust system drops (S3). Next, the control device 380 opens the first exhaust fuel gas discharge valve 395 (S4), and when the valve is already open, the open state may be maintained, or the valve opening degree may be set to change in more opening direction (when proceeding from S6). When the first exhaust fuel gas discharge valve 395 provided in the first exhaust fuel gas discharge line 394a is opened, the pressure of the fuel electrode side exhaust system drops. Next, the control device 380 confirms a fuel-air differential pressure ΔP based on the information transmitted from differential pressure gauge 90 (S5). AP is obtained by the following equation (1).

$$\Delta P = (\text{pressure of fuel electrode side system}) - (\text{pressure of air electrode side system}) \quad (1)$$

After confirming the fuel-air differential pressure, the control device 380 proceeds to S6. In S6, it is determined whether or not the absolute value of the fuel-air differential pressure ΔP is equal to or greater than a threshold value β (for example, 25 kPa). The determination is performed by the determination unit 381 of the control device 380. In a case where it is determined that the absolute value of the fuel-air differential pressure ΔP is not equal to or greater than the threshold value β, the process returns to S4, and the decompression is continued. In a case where it is determined that the absolute value of the fuel-air differential pressure ΔP is equal to or greater than the threshold value β, it is judged whether or not the pressure of the fuel electrode side system is higher than the pressure of the air electrode side system (S7). The judgement is performed by the judgment unit 382 of the control device 380. When the judgement is made in S7, the control device 380 proceeds to the control process (S8) for the second exhaust oxide gas discharge valve 393 and the second exhaust fuel gas discharge valve 396.

In S8, the process differs depending on whether or not the pressure of the fuel electrode side system is higher than the pressure of the air electrode side system. By making the pressure of the fuel electrode side exhaust system higher than the pressure of the air electrode side exhaust system, it is possible to suppress the inflow of the oxide gas from the air electrode side system to the fuel electrode side system. Accordingly, it is possible to prevent the SOFC 313 from deteriorating due to the inflow of the oxide gas into the fuel electrode side system, and in particular, prevent the fuel electrode 109 from being damaged. In a case where it is judged in S7 that the pressure of the fuel electrode side system is higher than the pressure of the air electrode side system, the process proceeds to S11, and it is confirmed that ΔP≥+γ1 (S11). In addition, γ1 is the same value as the predetermined threshold value β, but even in a case where the management value of the threshold value β has changed as a threshold value (for example, 20 kPa to 25 kPa) which is slightly smaller than the threshold value β of the upper limit, γ1 may be maintained as it is and it may not be necessary to change the value. Next, the control device 380 opens the second exhaust fuel gas discharge valve 396 (S12). When the second exhaust fuel gas discharge valve 396 is opened, then the control device 380 proceeds to S13. In S13, it is judged whether or not the fuel-air differential pressure ΔP is equal to or less than a predetermined threshold value. The predetermined threshold value is a numerical value (that is, +γ1−δ1) less than +γ1 by δ1, and the open state (S12) of the second exhaust fuel gas discharge valve 396 is continued until it is confirmed that the fuel-air differential pressure ΔP drops by δ1 from the predetermined threshold value+γ1 and reliably drops below the predetermined threshold value+γ1. The second exhaust fuel gas discharge valve 396 may be opened and closed intermittently in a stepwise manner to gradually change the fuel-air differential pressure ΔP within a predetermined threshold value.

Further, in S13, in a case where it is judged that the fuel-air differential pressure ΔP is not equal to or less than the predetermined threshold value, the open state of the second exhaust fuel gas discharge valve 396 is maintained, and in a case where it is judged that the fuel-air differential pressure ΔP is equal to or less than the predetermined threshold value, the process proceeds to S14. When the process proceeds to S14, the control device 380 closes the second exhaust fuel gas discharge valve 396 (S14). When the second exhaust fuel gas discharge valve 396 is closed, the process proceeds to S9.

In S7, in a case where it is judged that the pressure of the fuel electrode side system is not higher than the pressure of the air electrode side system (that is, the pressure of the air electrode side system is higher), the process proceeds to S15, and it is confirmed that ΔP−γ2 (S15). In addition, γ2 is the same value as the predetermined threshold value β, but even in a case where the management value of the threshold value β has changed as a threshold value (for example, −25 kPa to −20 kPa) which is slightly greater than the threshold value β of the lower limit, γ2 may be maintained as it is and it may not be necessary to change the value. Next, the control device 380 opens the second exhaust oxide gas discharge valve 393 (S16). When the second exhaust oxide gas discharge valve 393 is opened, then the control device 380 proceeds to S17. In S17, it is judged whether or not ΔP is equal to or greater than a predetermined threshold value. The predetermined threshold value is a numerical value (that is, −γ2+δ2) greater than −γ2 by δ2, and the open state (S18) of the second exhaust oxide gas discharge valve 393 is continued until it is confirmed that the fuel-air differential pressure ΔP increases by δ2 from the predetermined threshold value−γ2 and reliably increases by the predetermined threshold value−γ2. In addition, the second exhaust oxide gas discharge valve 393 may be opened and closed intermittently in a stepwise manner to gradually change the fuel-air differential pressure ΔP within a predetermined threshold value.

Further, in S13, in a case where it is judged that the fuel-air differential pressure ΔP is not equal to or greater than the predetermined threshold value, a process for maintaining the open state of the second exhaust oxide gas discharge valve 393 is performed, and in a case where it is judged that the fuel-air differential pressure ΔP is equal to or greater than the predetermined threshold value, the process proceeds to S18. When the process proceeds to S18, the control device 380 closes the second exhaust oxide gas discharge valve 393 (S18). When the second exhaust oxide gas discharge valve 393 is closed, the process proceeds to S9.

In S9, it is determined whether or not the absolute value of the fuel-air differential pressure ΔP is equal to or less than a threshold value α (for example, 0.1 kPa to kPa). In a case where it is determined that the absolute value of the fuel-air differential pressure ΔP is not equal to or less than the threshold value α, the process returns to S4, the fuel-air differential pressure ΔP is confirmed (S5), and determination (S6) as to whether or not the absolute value of the fuel-air differential pressure ΔP is equal to or greater than the threshold value β is made. In a case where it is determined that the absolute value of the fuel-air differential pressure ΔP is equal to or less than the threshold value α, the process proceeds to S10. In S10, the opened and closed state of each valve is maintained in the current state, and decompression is continued.

In this manner, when stopping the SOFC 313, the control device 380 performs the differential pressure control process.

Further, in the power generation system 310 of the present embodiment, when stopping the SOFC 313, the first exhaust oxide gas discharge valve 392 and the first exhaust fuel gas discharge valve 395 are opened to decompress the SOFC 313, but the initially set opening degree of each valve is, for example, 50%. Further, when the decompression proceeds and the pressure of the air electrode side system measured by the differential pressure gauge 90 becomes equal to or less than a predetermined threshold value (for example, 100 kPa to 500 kPa in the present embodiment), the control device 380 may further control the set opening degree of the first exhaust oxide gas discharge valve 392 and the first exhaust fuel gas discharge valve 395 from 50% in the opening direction, and the set opening degree may be, for example, 100%.

The pressure of each system when stopping the SOFC 313, and the open and close states of the valves provided in the exhaust oxide gas discharge line 391 and the exhaust fuel gas discharge line 394 will be described with reference to FIG. 8. In the graph at the uppermost part of FIG. 8, the vertical axis indicates pressure, and the horizontal axis indicates time. In the graphs other than the uppermost part in FIG. 8, the vertical axis indicates the opening degree of each valve, and the horizontal axis indicates time.

Figure 8:
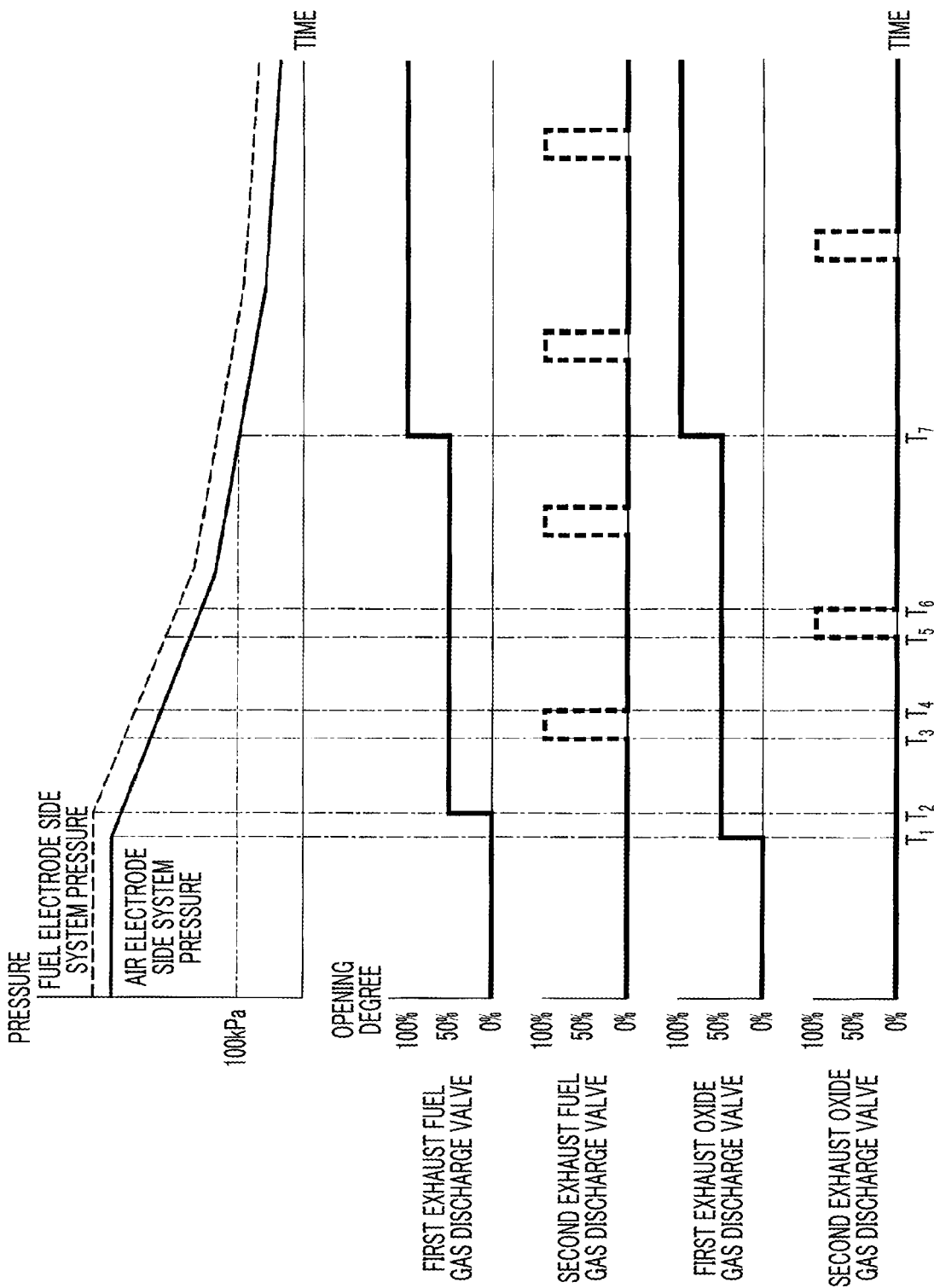
FIG. 8 is a graph illustrating a method for stopping a fuel cell of the power generation system according to the embodiment of the present invention.

As illustrated in FIG. 8, when stopping the SOFC 313, in a case where the decompression of the SOFC 313 is performed, first, in the present embodiment, the set opening degree of the first exhaust oxide gas discharge valve 392 changes from 0% (fully closed state) to, for example, 50% (first step) when the time is a timing T1 in the present embodiment. Accordingly, the decompression of the air electrode side exhaust system is started. Next, when the time is a timing T2, which is a predetermined time after T1, the set opening degree of the first exhaust fuel gas discharge valve 395 changes from 0% (fully closed state) to, for example, 50% (second step). Accordingly, the decompression of the fuel electrode side exhaust system is started. As the system, the pressure is reduced from the large-capacity air electrode side exhaust system, and the decompression of the fuel electrode side exhaust system, which has a smaller capacity than that of the air electrode side exhaust system, is followed and controlled, and thus, it becomes easy to control such that the fuel-air differential pressure is within a predetermined value while maintaining the decompression speed of the air electrode side exhaust system to be the target speed.

During the decompression of each system, in a case where the decompression speed of the fuel electrode side system becomes slow, the fuel-air differential pressure increases, and the pressure of the fuel electrode side system becomes higher than the pressure of the air electrode side system by a predetermined value or more, at the timing (for example, the time is a timing T3 in the present embodiment), the set opening degree of the second exhaust fuel gas discharge valve 396 is set to be, for example, 100% (fully open state) from 0%. Accordingly, the decompression speed of the fuel electrode side system increases, the increase in the fuel-air differential pressure is corrected, and the fuel-air differential pressure is reduced. When the fuel-air differential pressure is within a predetermined value range (for example, the time is a timing T4 in the present embodiment), the set opening degree of the second exhaust fuel gas discharge valve 396 is set to be 0% (fully open state) from 100%. The set opening degree of the second exhaust fuel gas discharge valve 396 is opened and closed in a stepwise manner. Accordingly, the decompression speed of the fuel electrode side system returns to the state before the time T3. In addition, in FIG. 8, a state where the fuel-air differential pressure is increasing is not illustrated for the sake of illustration (refer to FIG. 9 for a state where the fuel-air differential pressure is increasing). The same applies to the following description.

During the decompression of each system, in a case where the decompression speed of the air electrode side system becomes slow, the fuel-air differential pressure increases, and the pressure of the air electrode side system becomes higher than the pressure of the fuel electrode side system by a predetermined value or more, at the timing (for example, the time is a timing T5 in the present embodiment), the set opening degree of the second exhaust oxide gas discharge valve 393 is set to be, for example, 100% (fully open state) from 0%. Accordingly, the decompression speed of the air electrode side system increases, the increase in the fuel-air differential pressure is corrected, and the fuel-air differential pressure is reduced. When the fuel-air differential pressure is within a predetermined value range (for example, the time is a timing T6 in the present embodiment), the set opening degree of the second exhaust oxide gas discharge valve 393 is set to be 0% (fully open state) from 100%. The set opening degree of the second exhaust oxide gas discharge valve 393 is opened and closed in a stepwise manner. Accordingly, the decompression speed of the air electrode side system returns to the state before the time T5.

At time T7 which is a timing at which the decompression of the air electrode side system advances and the pressure of the air electrode side system becomes equal to or less than a predetermined threshold value (for example, 100 kPa to 500 kPa in the present embodiment), the set opening degree of the first exhaust oxide gas discharge valve 392 and the first exhaust fuel gas discharge valve 395 is set to be, for example, 100% (fully open state) from 50%.

In the fuel cell system 300 of the present embodiment, the decompression of the SOFC 313 is performed as described above. The opening and closing of the second exhaust fuel gas discharge valve 396 and the second exhaust oxide gas discharge valve 393 may be performed several times instead of once. In other words, the opening and closing operations of the second exhaust fuel gas discharge valve 396 and the second exhaust oxide gas discharge valve 393 may be performed intermittently in a stepwise manner.

According to the present embodiment, the following operation and effect can be obtained.

In the present embodiment, a plurality of exhaust fuel gas discharge lines 394 (in the present embodiment, two as an example) are provided, and the first exhaust fuel gas discharge valve 395 and the second exhaust fuel gas discharge valve 396 are provided in each exhaust fuel gas discharge line 394. Accordingly, by changing the first exhaust fuel gas discharge valve 395 and the second exhaust fuel gas discharge valve 396 to the set opening degree (including the fully open state and the fully closed state), in each exhaust fuel gas discharge line 394, it is possible to change the flow rate of the circulating exhaust fuel gas. In this manner, since the flow rate of the exhaust fuel gas discharged to the outside of the system can be changed and adjusted by the plurality of exhaust fuel gas discharge lines 394, compared to a structure in which the flow rate of the exhaust fuel gas is adjusted by the single exhaust fuel gas discharge line, it is possible to finely adjust the decompression speed of the fuel electrode side system by changing and adjusting the flow rate of the discharged exhaust fuel gas.

In addition, a plurality of exhaust oxide gas discharge lines 391 (in the present embodiment, two as an example) are provided, and the first exhaust oxide gas discharge valve 392 and the second exhaust oxide gas discharge valve 393 are provided in each exhaust oxide gas discharge line 391. Therefore, similar to the fuel electrode side system, it is possible to finely adjust the decompression speed of the air electrode side system.

In this manner, when stopping the SOFC 313, it is possible to finely adjust the decompression speed of the fuel electrode side system and the air electrode side system. Accordingly, it is possible to perform decompression in a state where the fuel-air differential pressure between the fuel electrode side system and the air electrode side system is suppressed within a predetermined range when stopping the SOFC 313. Therefore, it becomes possible to suppress deterioration or damage to the fuel cell system 300 due to the fuel-air differential pressure between the fuel electrode side system and the air electrode side system.

Further, since the exhaust fuel gas discharge line 394 and the exhaust oxide gas discharge line 391 include a plurality of lines provided in parallel, redundancy can be provided for a structure for discharging the fuel gas and the oxide gas to the atmosphere. Therefore, even when one discharge line of the exhaust fuel gas discharge line 394 and the exhaust oxide gas discharge line 391 becomes unusable due to damage or the like, the other discharge line can discharge the fuel gas or the oxide gas to the atmosphere. Therefore, the reliability of the fuel cell system 300 can be improved by providing redundancy.

Further, the air electrode side exhaust system has a larger volume than that of the fuel electrode side exhaust system. Therefore, in a case where the amount of gas existing in the system in the air electrode side exhaust system is greater than that in the fuel electrode side exhaust system and the flow rates of gas discharged to the outside of the system are almost the same in the systems, the pressure in the air electrode side system is unlikely to drop. In the present embodiment, the first exhaust oxide gas discharge valve 392 is opened before the first exhaust fuel gas discharge valve 395. Accordingly, the discharge from the air electrode side exhaust system where the pressure is unlikely to decrease is performed before the fuel electrode side exhaust system, and the pressure starts to drop. In this manner, the pressure of the air electrode side exhaust system, of which the pressure is unlikely to decrease, decreases first, and then the pressure of the fuel electrode side exhaust system, of which the pressure is likely to decrease, decreases, and thus, it is possible to suppress the fuel-air differential pressure within a predetermined range.

Further, by setting the decompression speed of the fuel electrode side exhaust system to be decompressed later to be substantially the same as the decompression speed of the air electrode side exhaust system, the fuel-air differential pressure during the decompression can be set to be within a predetermined range. In this manner, when the fuel electrode side system is decompressed, the decompression speed of the air electrode side system can be set as a target speed, the decompression is possible so as to follow the target speed, and thus, it is possible to facilitate the decompression control of the fuel electrode side system. Therefore, it is also possible to facilitate control of the fuel-air differential pressure.

In addition, since the pressure is reduced from the air electrode side exhaust system, the pressure of the fuel electrode side exhaust system becomes higher than the pressure of the air electrode side exhaust system when the SOFC 313 is decompressed. Accordingly, the inflow of the oxide gas from the air electrode side system to the fuel electrode side system can be suppressed. Therefore, it is possible to prevent the SOFC 313 from being deteriorated or damaged due to the inflow of the oxide gas into the fuel electrode side system. In addition, as the system, the pressure is reduced from the large-capacity air electrode side exhaust system, and the decompression of the fuel electrode side exhaust system, which has a smaller capacity than that of the air electrode side exhaust system, is followed and controlled, and thus, it becomes easy to control the fuel-air differential pressure while maintaining the decompression speed of the air electrode side system to be the target speed.

Further, as a structure for suppressing the fuel-air differential pressure within a predetermined range, it is also conceivable to provide a pressure equalizing line communicating with the exhaust fuel gas discharge line and the exhaust oxide gas discharge line. However, in the configuration in which the pressure equalizing line is provided, since the fuel gas and the oxide gas are mixed with each other, the combustion process must be performed while suppressing rapid combustion when performing the combustion process on the fuel gas, and there is a possibility that the structure becomes complicated and the installation space increases. When the size of the SOFC system increases, this tendency is remarkable, the size of the processing apparatus also increases, and the combustion process becomes more complicated, and thus, there is a possibility that an increase in installation space area of the entire fuel cell system and an increase in installation costs are caused.

In the present embodiment, the discharge lines of the fuel electrode side exhaust system and the air electrode side exhaust system do not communicate with each other, each of the plurality of discharge lines is provided in parallel with the exhaust fuel gas discharge line 394 and the exhaust oxide gas discharge line 391, and accordingly, it is possible to easily realize a structure for suppressing the fuel-air differential pressure within a predetermined range.

Therefore, as compared with the configuration in which the pressure equalizing line is provided, it is possible to suppress the installation space of the entire fuel cell system 300, and it is also possible to suppress the installation costs.

In addition, in the exhaust fuel gas discharge line 394 and the exhaust oxide gas discharge line 391, while one discharge line (the first exhaust fuel gas discharge line 394 and the first exhaust oxide gas discharge line 391*a*) among the plurality of discharge lines performs the discharge, the opening and closing of the discharge valve (the second exhaust fuel gas discharge valve 396 and the second exhaust oxide gas discharge valve 393) provided in the other discharge line (the second exhaust fuel gas discharge line 394*b* and the second exhaust oxide gas discharge line 391*b*) is controlled based on the fuel-air differential pressure. In a case where the second exhaust fuel gas discharge valve 396 and the second exhaust oxide gas discharge valve 393 are opened, the decompression speed of the exhaust side system of the electrode connected to the discharge line provided with the discharge valve increases. Meanwhile, in a case where the second exhaust fuel gas discharge valve 396 and the second exhaust oxide gas discharge valve 393 are closed, the decompression speed of the exhaust side system of the electrode connected to the discharge line provided with the discharge valve is reduced. In this manner, the decompression speed of the exhaust system of each electrode can be changed. Accordingly, it becomes possible to suppress the fuel-air differential pressure within a predetermined range.

Further, in the present embodiment, such control is performed by changing the exhaust flow rate from the air electrode side exhaust system and the fuel electrode side exhaust system based on the fuel-air differential pressure between the air electrode side system and the fuel electrode side system measured by the differential pressure gauge 90, and thus, it becomes possible to more suitably reduce the fuel-air differential pressure between the fuel electrode side system and the air electrode side system when stopping the SOFC 313.

Figure 9:
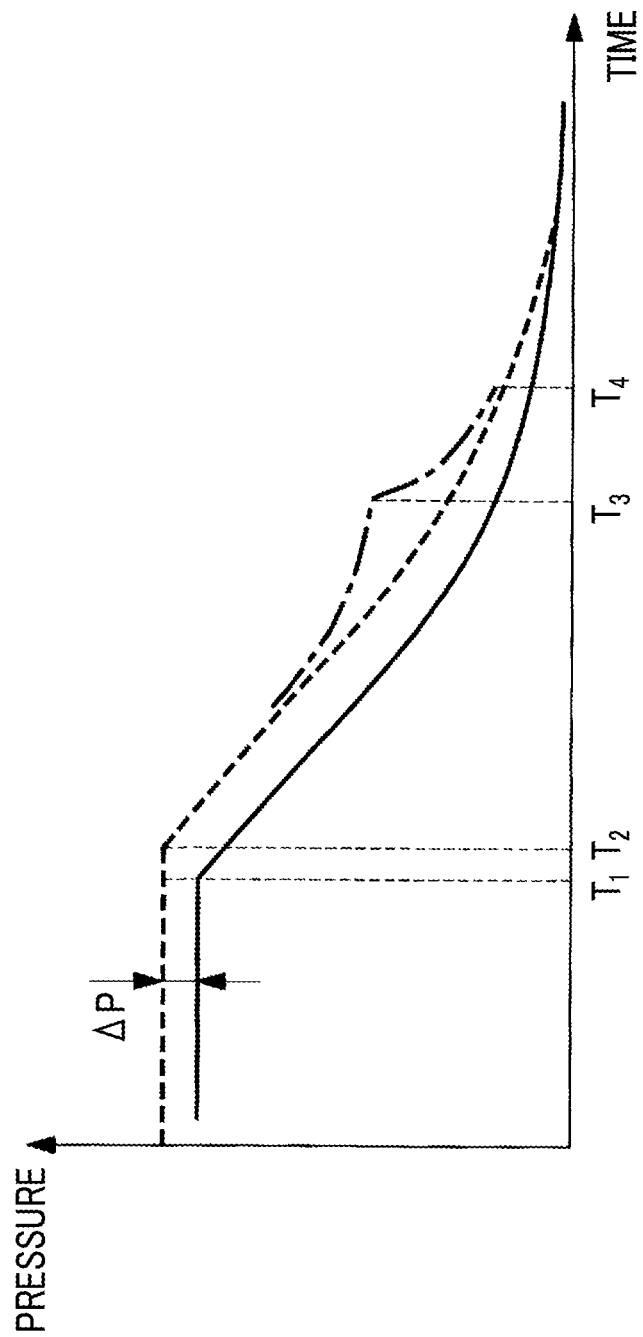
FIG. 9 is a graph illustrating a relationship between the pressure of a fuel electrode side system, the pressure of an air electrode side system, and time in the fuel cell according to the embodiment of the present invention.

The detailed effects will be described with reference to FIG. 9. FIG. 9 is a graph illustrating the relationship between the pressure and the time of each system when the SOFC 313 is decompressed, where the vertical axis indicates the pressure and the horizontal axis indicates the time. In the graph, the solid line indicates the decompression aspect of the air electrode side system, the broken line indicates the decompression aspect of the fuel electrode side system when a state where the pressure of the fuel electrode side system is higher than the pressure of the air electrode side system by a predetermined value, and the one-dot chain line indicates the decompression aspect of the fuel electrode side system when the pressure of the fuel electrode side system increases to be higher than the pressure of the air electrode side system by a predetermined value or more. Further, the time T1 indicates a timing at which the first exhaust oxide gas discharge valve 392 is opened and decompression of the air electrode side system is started, and the time T2 indicates a timing at which the first exhaust fuel gas discharge valve 395 is opened and decompression of the fuel electrode side system is started. In addition, the time T3 indicates a timing at which the second exhaust fuel gas discharge valve 396 is opened in a stepwise manner, and the time T4 indicates a timing at which the second exhaust fuel gas discharge valve 396 is closed.

As illustrated in FIG. 9, when the fuel-air differential pressure $\Delta P$ increases, when the second exhaust fuel gas discharge valve 396 is opened, the decompression speed of the fuel electrode side exhaust system increases, and the increase in fuel-air differential pressure $\Delta P$ is corrected and reduced. Further, when the second exhaust fuel gas discharge valve 396 is closed, the decompression speed of the fuel electrode side exhaust system becomes slow, and the reduction of the fuel-air differential pressure $\Delta P$ can be eased to be within a predetermined range. In this manner, it is possible to maintain the fuel-air differential pressure $\Delta P$ within a predetermined range.

In the present embodiment, two or more types of valves having different driving sources can be provided in each of the plurality of discharge lines provided in parallel with the exhaust fuel gas discharge line 394 and the exhaust oxide gas discharge line 391. In other words, the first exhaust oxide gas discharge valve 392 and the first exhaust fuel gas discharge valve 395 are motor valves driven by a motor, and the second exhaust oxide gas discharge valve 393 and the second exhaust fuel gas discharge valve 396 are pneumatic valves driven by the compressed air. Accordingly, redundancy can be provided for the driving source for the structure for discharging the fuel gas and the oxide gas to the outside of the system. Therefore, even in a case where one of the driving sources fails to operate due to a failure or the like, the valve unit driven by the other driving source is driven, and thus, it is possible to reliably perform the discharge of the fuel gas and the oxide gas to the outside of the system. The driving source in the present embodiment may use electricity and air, but for example, different driving sources may be used as air systems having the same supply of air but different supply sources. In addition, different driving sources may be used as an electric system having the same supply of electricity but different supply sources.

In the present embodiment, when stopping the SOFC 313, the set opening degree of the first exhaust oxide gas discharge valve 392 and the first exhaust fuel gas discharge valve 395 is set to, for example, 50% at the start of decompression, and then the set opening degree of each valve is set to be 100% (fully open state) at a predetermined timing. In other words, the pressure of the SOFC 313 is gradually reduced. Accordingly, when stopping the SOFC 313, the pressure in the SOFC 313 does not decrease sharply, and thus, it is possible to reduce a rapid change in the fuel-air differential pressure generated in the SOFC 313. In addition, by gradually reducing the pressure, it is possible to facilitate the control of the fuel-air differential pressure.

The present invention is not limited to the above-described embodiments, and can be appropriately modified without departing from the gist of the present invention.

For example, in the above-described embodiment, when the decompression is started, the set opening degree of the first exhaust oxide gas discharge valve 392 and the first exhaust fuel gas discharge valve 395 is set to 50%, but the present invention is not limited thereto. The set opening degree of the first exhaust oxide gas discharge valve 392 and the first exhaust fuel gas discharge valve 395 may be less than 50%, or may be equal to or greater than 50%. Further, the set opening degree may be 100%.

Further, in the above-described embodiment, an example in which the second exhaust oxide gas discharge valve 393 and the second exhaust fuel gas discharge valve 396 are opening-closing valves has been described, but the present invention is not limited thereto. The first exhaust oxide gas discharge valve 392 and the first exhaust fuel gas discharge valve 395, and the second exhaust oxide gas discharge valve 393 and the second exhaust fuel gas discharge valve 396 may be flow regulation valves.

Further, the set opening degree of the first exhaust oxide gas discharge valve 392 and the first exhaust fuel gas discharge valve 395 may be changed and adjusted based on the fuel-air differential pressure measured by the differential pressure gauge 90.

In such a configuration, by changing and adjusting the set opening degree of the first exhaust oxide gas discharge valve 392 and the first exhaust fuel gas discharge valve 395, it is possible to adjust the flow rate of the discharged gas, and to change and adjust the decompression speed of the discharge system of each electrode. In this manner, since the first exhaust oxide gas discharge valve 392 and the first exhaust fuel gas discharge valve 395 can suppress the fuel-air differential pressure between the fuel electrode side system and the air electrode side system when stopping the SOFC 313 within a predetermined range, it is possible to reduce the number of times of driving the second exhaust fuel gas discharge valve 396 and the second exhaust oxide gas discharge valve 393.

Further, in the above-described embodiment, an example was described in which two exhaust oxide gas discharge lines 391 and two exhaust fuel gas discharge lines 394 were provided, but the present invention is not limited thereto. The exhaust oxide gas discharge line 391 and the exhaust fuel gas discharge line 394 may be provided in parallel in plural numbers, and three or more lines may be provided.

Further, in the above-described embodiment, an example in which each valve is operated by the control device 380 has been described, but each valve may be operated by an operator.

REFERENCE SIGNS LIST

90: differential pressure gauge (differential pressure measuring means, pressure measuring means)
109: fuel electrode
113: air electrode
300: fuel cell system
310: power generation system (hybrid power generation system)
311: micro gas turbine, MGT (gas turbine device)
312: generator
313: SOFC (fuel cell)
321: compressor
322: combustor
323: turbine
324: rotary shaft
325: air intake line
326: first oxide gas supply line
328: combustion gas supply line
329: combustion exhaust gas line
330: heat exchanger
331: second oxide gas supply line
332: bypass line
333: exhaust oxide gas line
334: exhaust oxide gas supply line
341: second fuel gas supply line
343: exhaust fuel gas line
345: exhaust fuel gas supply line
348: recirculation blower
349: fuel gas recirculation line
351: first fuel gas supply line
361: pure water supply line
362: pump
371: air electrode fuel supply line
380: control device
381: determination unit
382: judgment unit
383: first discharge valve control unit (discharge valve control unit)
384: second discharge valve control unit
391: exhaust oxide gas discharge line
391a: first exhaust oxide gas discharge line
391b: second exhaust oxide gas discharge line
392: first exhaust oxide gas discharge valve
393: second exhaust oxide gas discharge valve
394: exhaust fuel gas discharge line
394a: first exhaust fuel gas discharge line
394b: second exhaust fuel gas discharge line
395: first exhaust fuel gas discharge valve
396: second exhaust fuel gas discharge valve

The invention claimed is:
1. A fuel cell system comprising:
a fuel cell that includes an air electrode, a solid electrolyte, and a fuel electrode and that generates power as a result of an oxide gas being supplied to the air electrode and a fuel gas being supplied to the fuel electrode;
an exhaust fuel gas line that is connected to the fuel cell and that discharges an exhaust fuel gas after being used for a reaction in the fuel electrode;
a plurality of exhaust fuel gas discharge lines that are connected to the same exhaust fuel gas line and that discharge, to the outside of a system, the exhaust fuel gas that has been discharged from the fuel electrode;

exhaust fuel gas discharge valves that are respectively provided to the plurality of exhaust fuel gas discharge lines;

an exhaust oxide gas line that is connected to the fuel cell and that discharges an exhaust oxide gas after being used for a reaction in the air electrode;

a plurality of exhaust oxide gas discharge lines that are connected to the same exhaust oxide gas line and that discharge, to the outside of the system, the exhaust oxide gas that has been discharged from the air electrode;

exhaust oxide gas discharge valves that are respectively provided to the plurality of exhaust oxide gas discharge lines; and a control device that, when stopping the fuel cell, opens the exhaust oxide gas discharge valves before the exhaust fuel gas discharge valves.

2. The fuel cell system according to claim 1, further comprising:

differential pressure measuring means for measuring a differential pressure between an air electrode side system which is a system on the air electrode side and a fuel electrode side system which is a system on the fuel electrode side, in the fuel cell, wherein the plurality of exhaust fuel gas discharge lines include a first exhaust fuel gas discharge line provided with a first exhaust fuel gas discharge valve, and a second exhaust fuel gas discharge line provided in parallel with the first exhaust fuel gas discharge line and provided with a second exhaust fuel gas discharge valve, wherein the plurality of exhaust oxide gas discharge lines include a first exhaust oxide gas discharge line provided with a first exhaust oxide gas discharge valve, and a second exhaust oxide gas discharge line provided in parallel with the first exhaust oxide gas discharge line and provided with a second exhaust oxide gas discharge valve, and wherein the control device performs control to change the second exhaust fuel gas discharge valve and/or the second exhaust oxide gas discharge valve to a predetermined opening degree based on the differential pressure measured by the differential pressure measuring means in a state where the first exhaust fuel gas discharge valve and the first exhaust oxide gas discharge valve are opened when stopping the fuel cell.

3. The fuel cell system according to claim 2, wherein a driving source for driving the first exhaust fuel gas discharge valve and a driving source for driving the second exhaust fuel gas discharge valve are different from each other, and wherein a driving source for driving the first exhaust oxide gas discharge valve and a driving source for driving the second exhaust oxide gas discharge valve are different from each other.

4. The fuel cell system according to claim 2, wherein the control device includes a determination unit that determines whether or not the differential pressure measured by the differential pressure measuring means is equal to or greater than a predetermined threshold value, a judgment unit that judges which of the air electrode side system and the fuel electrode side system is higher in pressure, in a case where the determination unit determines that the differential pressure is equal to or greater than the predetermined threshold value, and a discharge valve control unit that sets an opening degree of the discharge valve, which is provided on the system side judged to have a higher pressure by the judgment unit, out of the second exhaust fuel gas discharge valve and the second exhaust oxide gas discharge valve, to be greater than a current opening degree.

5. The fuel cell system according to claim 2, wherein the first exhaust fuel gas discharge valve and the first exhaust oxide gas discharge valve are valves that are changeable to a predetermined opening degree, and wherein, when stopping the fuel cell, based on the differential pressure measured by the differential pressure measuring means, the control device changes an opening degree of the first exhaust fuel gas discharge valve and/or the first exhaust oxide gas discharge valve, and changes a flow rate of a gas discharged from the first exhaust fuel gas discharge line and/or the second exhaust oxide gas discharge line.

6. The fuel cell system according to claim 1, further comprising:

pressure measuring means for measuring a pressure of an air electrode side system which is a system on the air electrode side and a fuel electrode side system which is a system on the fuel electrode side, in the fuel cell, wherein the plurality of exhaust fuel gas discharge lines include a first exhaust fuel gas discharge line provided with a first exhaust fuel gas discharge valve, and a second exhaust fuel gas discharge line provided in parallel with the first exhaust fuel gas discharge line and provided with a second exhaust fuel gas discharge valve, wherein the plurality of exhaust oxide gas discharge lines include a first exhaust oxide gas discharge line provided with a first exhaust oxide gas discharge valve, and a second exhaust oxide gas discharge line provided in parallel with the first exhaust oxide gas discharge line and provided with a second exhaust oxide gas discharge valve, wherein the first exhaust fuel gas discharge valve and the first exhaust oxide gas discharge valve are valves that are changeable to a predetermined set opening degree, and wherein, when stopping the fuel cell, in a case where the pressure of the air electrode side system is equal to or less than a predetermined threshold value, the control device changes opening degrees of the first exhaust fuel gas discharge valve and the first exhaust oxide gas discharge valve to be greater.

7. A hybrid power generation system comprising:

the fuel cell system according to claim 1; and a gas turbine device including a turbine, a generator connected to the turbine, a combustor for feeding a combustion gas to the turbine, and a compressor capable of supplying the oxide gas to the combustor and the air electrode, wherein a part of the exhaust fuel gas discharged from the fuel electrode of the fuel cell is supplied to the combustor, and wherein the oxide gas compressed by the compressor is supplied to the air electrode of the fuel cell, and at least a part of the exhaust oxide gas discharged from the air electrode is supplied to the combustor.

8. A hybrid power generation system comprising:
the fuel cell system according to claim 1;
a turbocharger device including a turbine and a compressor connected to the turbine and capable of supplying the oxide gas to the air electrode; and
a combustor for feeding a combustion gas to the turbine,
wherein at least a part of the combustion gas of the exhaust fuel gas discharged from the fuel electrode of the fuel cell is supplied to the combustor, and
wherein the oxide gas compressed by the compressor is supplied to the air electrode of the fuel cell, and at least a part of the exhaust oxide gas discharged from the air electrode is supplied to the combustor.

9. A control method for a fuel cell system including a fuel cell that generates power as a result of an oxide gas being supplied to an air electrode and a fuel gas being supplied to a fuel electrode provided while interposing a solid electrolyte between the air electrode and the fuel electrode,
wherein the fuel cell system includes an exhaust fuel gas line that is connected to the fuel cell and that discharges an exhaust fuel gas after being used for a reaction in the fuel electrode, a plurality of exhaust fuel gas discharge lines that are connected to the same exhaust fuel gas line and that are capable of discharging, to the outside of a system, the exhaust fuel gas that has been discharged from the fuel electrode, exhaust fuel gas discharge valves that are respectively provided to the plurality of exhaust fuel gas discharge lines, an exhaust oxide gas line that is connected to the fuel cell and that discharges an exhaust oxide gas after being used for a reaction in the air electrode, a plurality of exhaust oxide gas discharge lines that are connected to the same exhaust oxide gas line and that are capable of discharging, to the outside of the system, the exhaust oxide gas that has been discharged from the air electrode, and exhaust oxide gas discharge valves that are respectively provided to the plurality of exhaust oxide gas discharge lines,
wherein the method comprises:
a first step of opening the exhaust oxide gas discharge valve when stopping the fuel cell, and
a second step of opening the exhaust fuel gas discharge valves after the first step.

* * * * *